(12) United States Patent
Yoshida et al.

(10) Patent No.: US 7,138,206 B2
(45) Date of Patent: Nov. 21, 2006

(54) METHOD OF MANUFACTURING SEPARATOR FOR FUEL CELL

(75) Inventors: Takashi Yoshida, Sayama (JP); Kenichi Ishiguro, Sayama (JP); Yoshitsugu Nishi, Sayama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 422 days.

(21) Appl. No.: 10/482,982

(22) PCT Filed: Jun. 26, 2002

(86) PCT No.: PCT/JP02/06427

§ 371 (c)(1),
(2), (4) Date: Jan. 6, 2004

(87) PCT Pub. No.: WO03/007407

PCT Pub. Date: Jan. 23, 2003

(65) Prior Publication Data

US 2004/0195724 A1    Oct. 7, 2004

(30) Foreign Application Priority Data

Jul. 9, 2001  (JP) .............................. 2001-207732
Jun. 12, 2002 (JP) .............................. 2002-171399

(51) Int. Cl.
*H01M 2/00* (2006.01)
*H01M 2/14* (2006.01)
*H01M 2/16* (2006.01)

(52) U.S. Cl. ...................................... 429/129; 427/115

(58) Field of Classification Search ..................... None
See application file for complete search history.

(56) References Cited

U.S. PATENT DOCUMENTS 4,664,988 A   5/1987   Shigeta et al.
4,913,982 A   4/1990   Kotchick et al.

FOREIGN PATENT DOCUMENTS

| JP | 60-236459 | 11/1985 |
|---|---|---|
| JP | 61-019070 | 1/1986 |
| JP | 63-178456 | 7/1988 |
| JP | 11-297334 | 10/1999 |
| JP | 2000-123848 | 4/2000 |
| JP | 2002-134130 | 5/2002 |

*Primary Examiner*—Patrick Joseph Ryan
*Assistant Examiner*—Karie O'Neill
(74) *Attorney, Agent, or Firm*—Rankin, Hill, Porter & Clark LLP

(57) ABSTRACT

In manufacturing a separator for use in a fuel cell, first, a core (31, 94) is interposed between two preforms (17, 90, 101) and a with-core separator (41, 95, 107) is formed. After this, the core is melted by heating and discharged to form multiple cooling water passages (54). Because consequently there is no need to bring separators together to form the cooling water passages, a seal becomes unnecessary. Also, since there is no need to bring separators together the electrical contact resistance also falls.

3 Claims, 28 Drawing Sheets

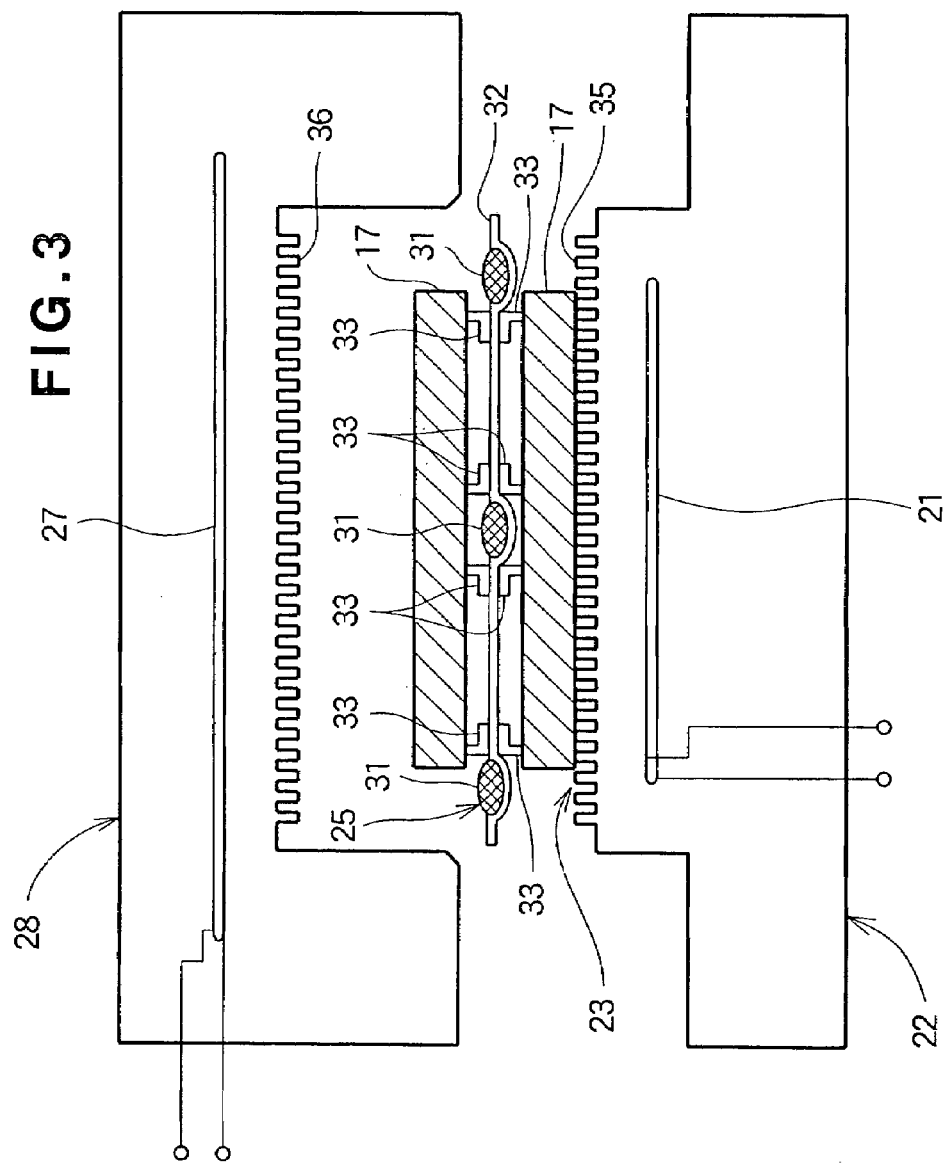

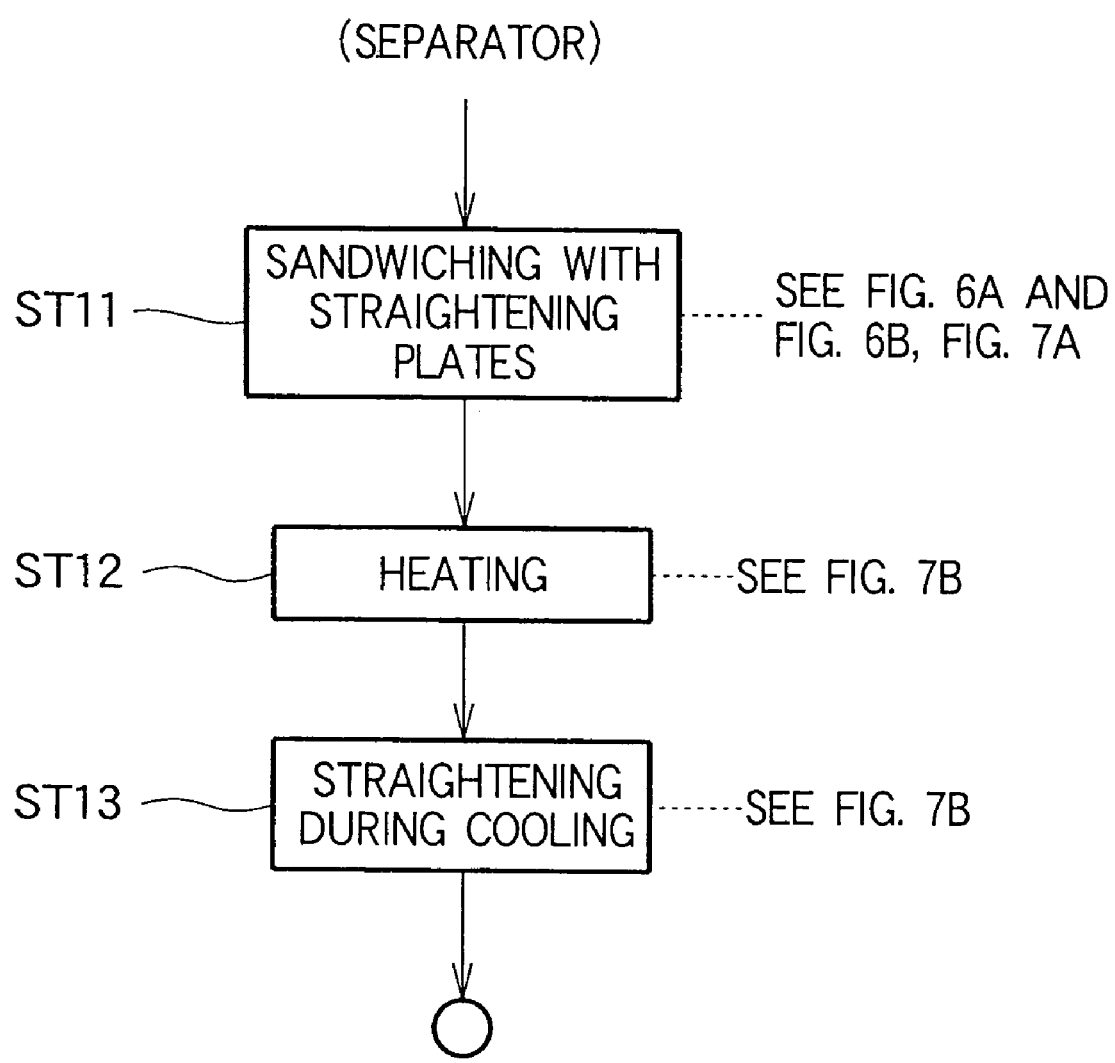

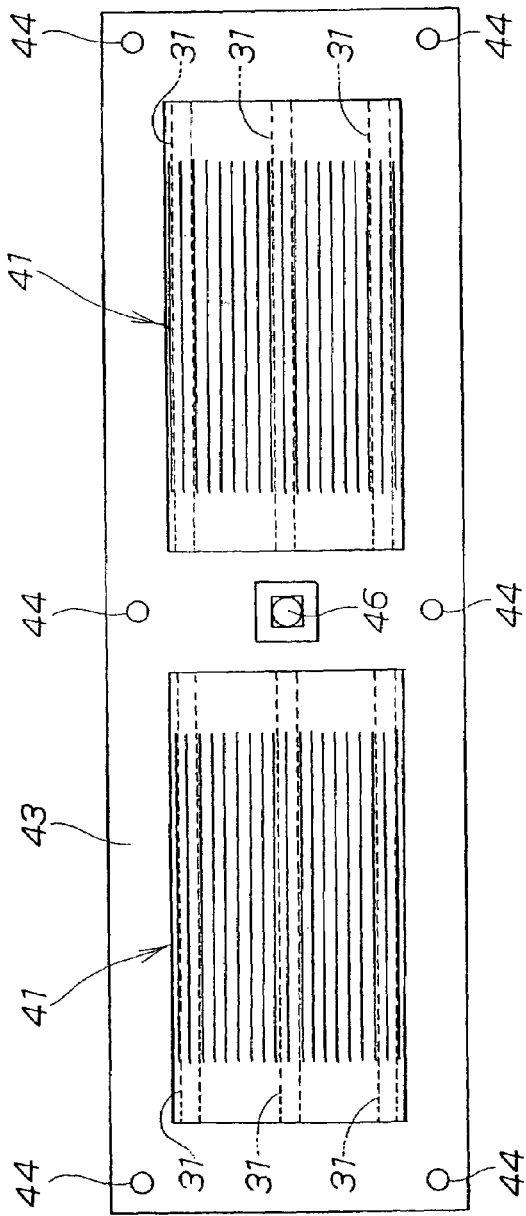
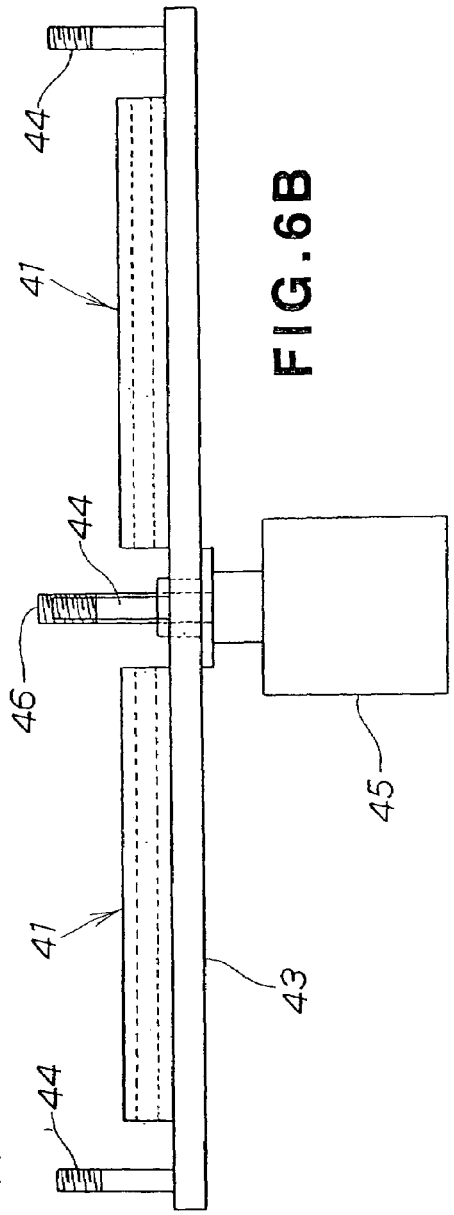

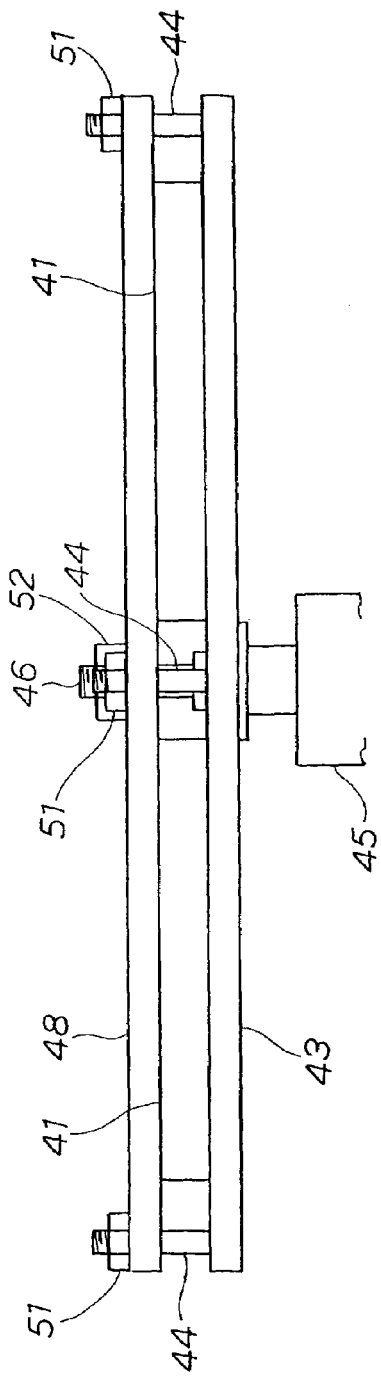
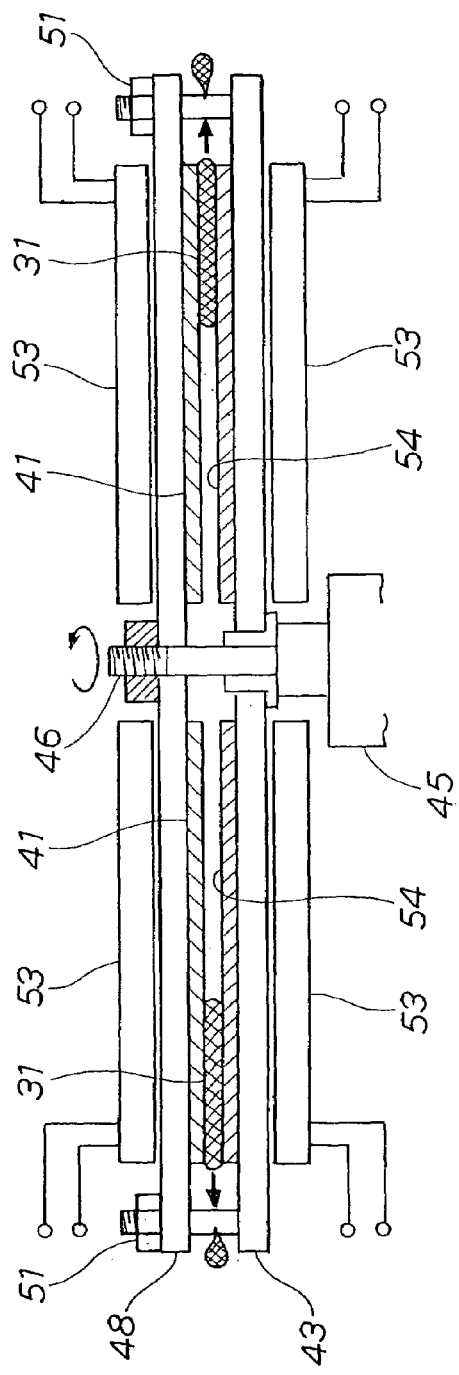

METHOD OF MANUFACTURING SEPARATOR FOR FUEL CELL

TECHNICAL FIELD

This invention relates to a method for manufacturing a fuel cell separator for constituting a cell module by appending an anode side electrode and a cathode side electrode to an electrolyte film and sandwiching these from both sides.

BACKGROUND ART

A fuel cell utilizes a principle opposite the water electrolysis to generate electricity by causing hydrogen and airborne oxygen to chemically react. Theoretically, the only emission is water. Generally, hydrogen is used as the fuel gas and air or an oxidant gas is used as the oxygen.

As a fuel cell of this kind, for example the "fuel cell" disclosed in Japanese Patent Laid-Open Publication No. 2000-123848 is known. This fuel cell has a structure wherein a cell module is constructed by sandwiching an electrolyte film with an anode electrode and a cathode electrode and sandwiching the outer side faces of the anode electrode and the cathode electrode with a first separator and a second separator respectively by way of gaskets.

More specifically, first flow passages to become fuel gas flow passages are formed on the inner side face of the first separator, second flow passages to become oxidant gas flow passages are formed on the inner side face of the second separator, and these flow passages respectively supply fuel gas and oxidant gas to the electrolyte film in the center.

As mentioned above, because the electricity output obtained with one cell module is small, a required electricity output is obtained by making a stack of many such cell modules. The first and second separators are called "separators" because they are separating members for preventing fuel gas or oxidant gas from leaking into adjacent cells.

The first separator has first flow passages for fuel gas on its inner side face, and the second separator has second flow passages for oxidant gas on its inner side face; it is necessary for the gases to be brought into contact with the anode side electrode and the cathode side electrode effectively, and for this it is necessary for many extremely shallow grooves to be provided as the first and second flow passages.

The first and second separators each have in a top part a fuel supply opening and an oxidant gas supply opening for supplying fuel gas and oxidant gas to the first and second flow passages, and each have in a bottom part a fuel gas discharge opening and an oxidant gas discharge opening. Also, the first and second separators each have a cooling water supply opening for passing cooling water in their top part and have a cooling water discharge opening in their bottom part.

The cooling water supply opening and the cooling water discharge opening are each connected to cooling water passages. The cooling water passages are for example formed by cooling water passage grooves being formed in outer side faces of the first separator and the second separator and these cooling water passage grooves being brought together with cooling water passage grooves formed in a separator of an adjacent cell.

When the cooling water passages are formed by bringing separators together like this, a seal member for preventing the leakage of cooling water becomes necessary at the interface of the separators, and the thickness, shape and material and so on of this seal member must be considered.

Also, on one side of the first separator or the second separator gas flow passage grooves must be provided, and on the other side cooling water passage grooves must be provided, and the molding of the grooves becomes difficult.

And also, because separators are brought together, electrical contact resistance between the separators increases, and it may happen that due to this contact resistance a voltage drop arises in each cell and the output of the fuel cell becomes small.

So, when manufacturing a separator for a fuel cell, in forming the cooling water passages in the separator, it is desirable that a seal not be necessitated and that it be possible to form the cooling water passages easily, and furthermore that output decrease of the fuel cell be suppressed.

DISCLOSURE OF THE INVENTION

According to the invention, a fuel cell separator manufacturing method is provided which is a fuel cell separator manufacturing method wherein a preform is molded from a knead of carbon and a thermosetting resin and this preform is used to form cooling water passages between adjacent separators, characterized in that it includes: a step of interposing a core for forming the cooling water passages and a holding member for holding this core between two of the preforms; a step of molding a separator by compressing and heating the preforms and the core and the holding member en bloc; and a step of forming the cooling water passages by melting and discharging the core in a subsequent heating process.

Because in the method of this invention a separator having a core and a holding member embedded in it is molded and cooling water passages are formed by melting and discharging the core, there is no bringing together of two separators as in related art and a seal becomes unnecessary. Also, because the core and the holding member are interposed between two preforms and the preforms, the core and the holding member are compressed and heated en bloc and the core is melted and discharged in a heating process thereafter, the embedding of the core in the separator and the discharging of the core can be carried out easily, and the cooling water passages can be formed easily. And also, because there is no bringing together of separators, electrical contact resistance does not arise and there is no decreasing of the output of the fuel cell.

As the core used in this invention, preferably it is a low-melting-point metal. The core can be easily melted; after melting it can be easily discharged from inside the separator; and the manufacturability of the separator can be raised. Also, the low-melting-point metal discharged from inside the separator can be used as a core any number of times, and material costs can be kept down.

As an example of the heating process of after the separator is molded, preferably an annealing treatment is carried out. Because the core melts and discharges in the heating process of annealing, it is not necessary for a heating process to be provided especially for the melting of the core, and the manufacturing labor of the separator can be reduced.

Also, according to the invention, a fuel cell separator manufacturing method is provided which includes: a step of making with a water-soluble polymer a core for forming gas passages; a step of disposing the core in the cavity of a metal mold and disposing an electrode diffusion layer in a gap between the core and the cavity face; a step of filling the cavity with molten resin; a step of removing a separator with the molten resin solidified from inside the cavity after forming the core and the electrode diffusion layer integrally; and a step of forming gas passages in the surface of the separator with the separator and the electrode diffusion layer by dissolving out the core from the separator with water.

That is, in this invention, a core for forming gas passages is made with a water-soluble polymer, and gas passages are formed by dissolving the core with water after the molding of the separator. Because the core inside the separator can be dissolved out with water like this, gas passages can be formed in the separator simply, and the separator can be manufactured simply.

Here, a normal fuel cell has an anode electrode diffusion layer between an anode side electrode and a separator and has a cathode electrode diffusion layer between a cathode side electrode and a separator. Consequently, because an anode electrode diffusion layer is being appended to a separator and a cathode electrode diffusion layer is being appended to a separator, the electrical contact resistance between the separator and the anode electrode diffusion layer and the electrical contact resistance between the separator and the cathode electrode diffusion layer may increase. And there is a risk of this contact resistance causing the voltage of the fuel cell to fall and the output of the fuel cell to become small.

So, in this invention, the separator is formed integrally with the electrode diffusion layer. By this means, it is possible to suppress electrical contact resistance between the separator and the electrode diffusion layer and prevent output decrease of the fuel cell.

And also, according to the invention, a fuel cell separator manufacturing method is provided which includes: a step of making with a water-soluble polymer a gas passage core and a cooling water passage core for forming gas passages and cooling water passages; a step of disposing the gas passage core so as to face the cavity face of a metal mold and disposing an electrode diffusion layer in a gap between the gas passage core and the cavity face and disposing the cooling water passage core a predetermined spacing from the gas passage core; a step of filling the cavity with molten resin; a step of removing a separator with the molten resin solidified from inside the cavity after forming the gas passage core, the cooling water passage core and the electrode diffusion layer integrally; and a step of forming gas passages in the surface of the separator with the separator and the electrode diffusion layer and forming cooling water passages inside the separator by dissolving out the gas passage core and the cooling water passage core from the separator with water.

In this invention, gas passages can be formed by making a gas passage core for forming gas passages with a water-soluble polymer and dissolving the gas passage core with water after the molding of the separator. Because the gas passage core inside the separator can be dissolved out with water like this, gas passages can be formed in the separator simply. Also, by the electrode diffusion layer being formed integrally with the separator, the electrical contact resistance between the separator and the electrode diffusion layer is suppressed.

Here, in a normal separator, cooling water passages are formed by bringing a pair of separators face-to-face and bringing together cooling water passage grooves of one of the separators with cooling water passage grooves of the other separator. As a result of the pair of separators being brought face-to-face like this, the electrical contact resistance between the pair of separators increases. And there is a risk of this contact resistance causing the voltage of the fuel cell to fall and the output of the fuel cell to become small.

So, in this invention, cooling water passages are formed inside a separator by making a cooling water core with a water-soluble polymer and dissolving the cooling water core with water after the molding of the separator. Because cooling water passages can be formed inside the separator, there is no need for a pair of separators to be brought face-to-face to form the cooling water passages, and the electrical contact resistance which arises between pairs of separators in related art can be eliminated.

BRIEF DESCRIPTION OF THE DRAWINGS

FIG. 3 is a view showing a separator mold used in a fuel cell separator manufacturing method according to the first embodiment, and shows a mold open.

FIG. 5 illustrates a flow chart of a fuel cell separator annealing method of a first embodiment.

FIG. 6A and FIG. 6B are views illustrating annealing and core-discharging according to the first embodiment.

FIG. 7A and FIG. 7B are views showing annealing and core-discharging according to the first embodiment being carried out.

BEST MODE FOR CARRYING OUT THE INVENTION

Figure 1:
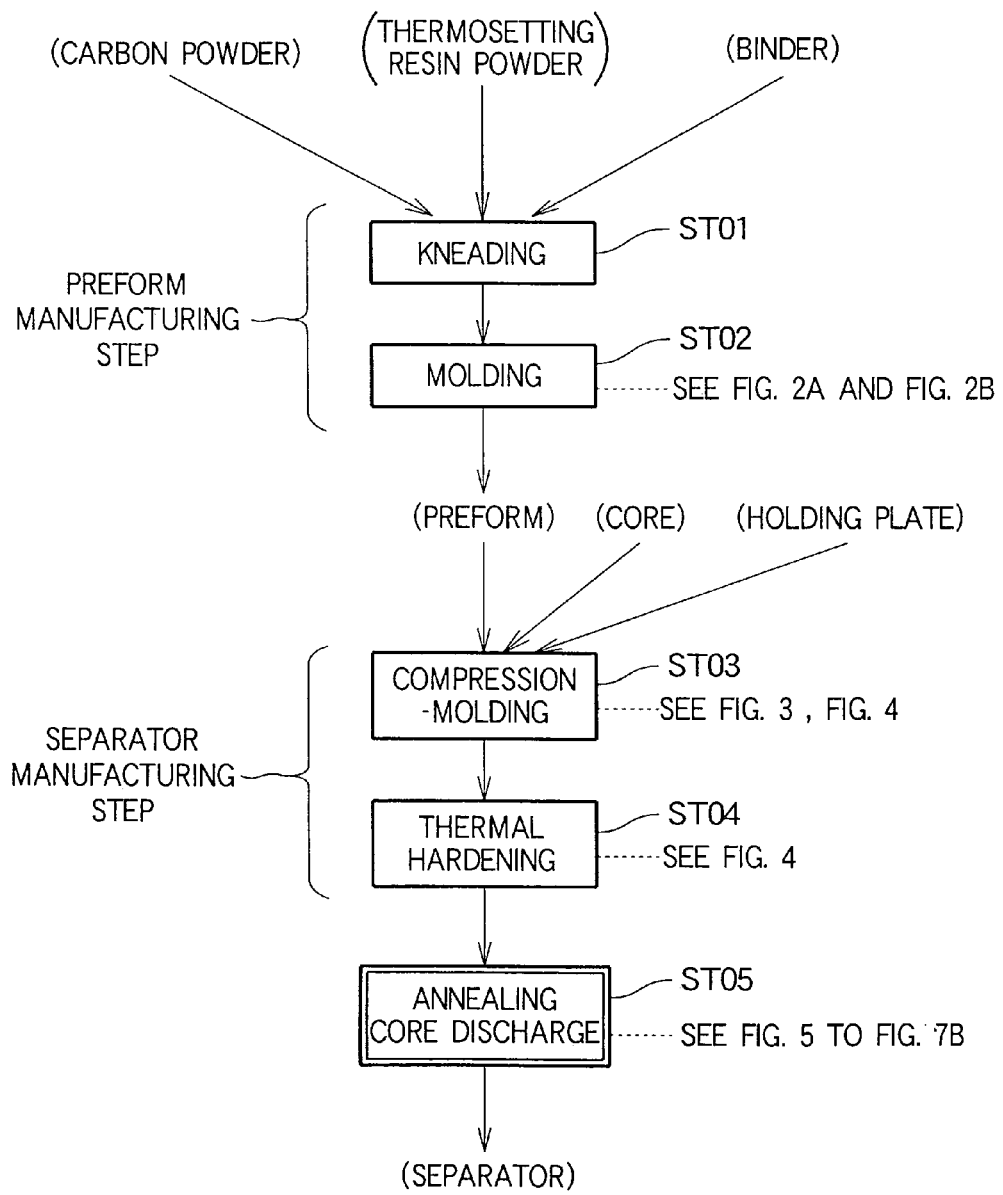
FIG. 1 is a view showing a flow chart of a fuel cell separator manufacturing method according to a first embodiment of the invention.

FIG. 1 shows a manufacturing flow chart of a fuel cell separator according to a first embodiment of the invention.

Step (hereinafter, ST) 01: Carbon powder and thermosetting resin powder are blended in a predetermined blend ratio, a suitable amount of binder is added, and the blend is kneaded.

Figure 2A:
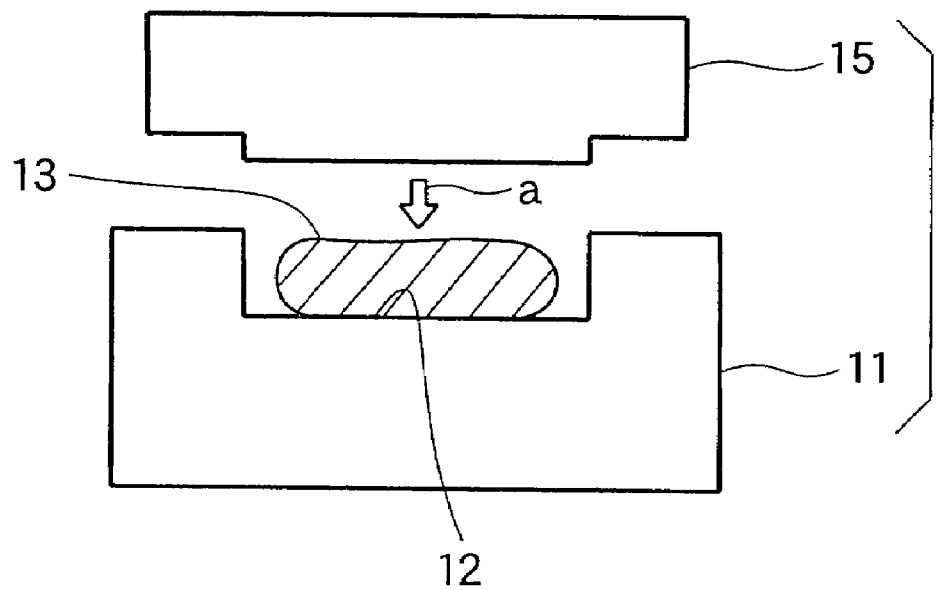
FIG. 2A and FIG. 2B are views showing a step of preform molding according to the first embodiment.
Figure 2B:
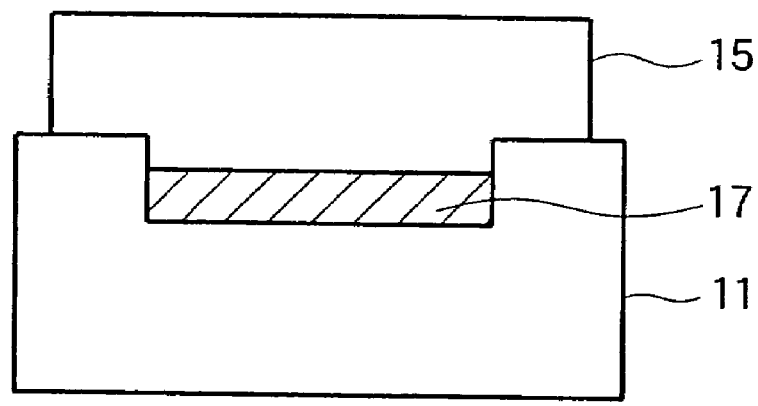

ST02: A preform is made by molding the kneaded mixture as shown in FIG. 2A and FIG. 2B. First, in FIG. 2A, the knead 13 is placed on a molding face 12 of a lower preform molding die 11. Then, an upper preform molding die 15 is lowered as shown by the arrow a, and the knead 13 is pressure-molded. Next, as shown in FIG. 2B, a preform 17 of a required shape is molded by the lower preform molding die 11 and the upper preform molding die 15.

ST03: A core and a holding plate holding this core are interposed between two of these preforms, and the preforms, core and holding plate are compression-molded en bloc.

ST04: Substantially simultaneously with the start of this compression molding, a thermal hardening treatment is carried out, and the preforms are thereby completely hardened to make a separator.

ST05: The molded separator is annealed.

Annealing is, generally, baking of a glass, ceramic or metal for the relief and prevention of stresses.

Figure 4:
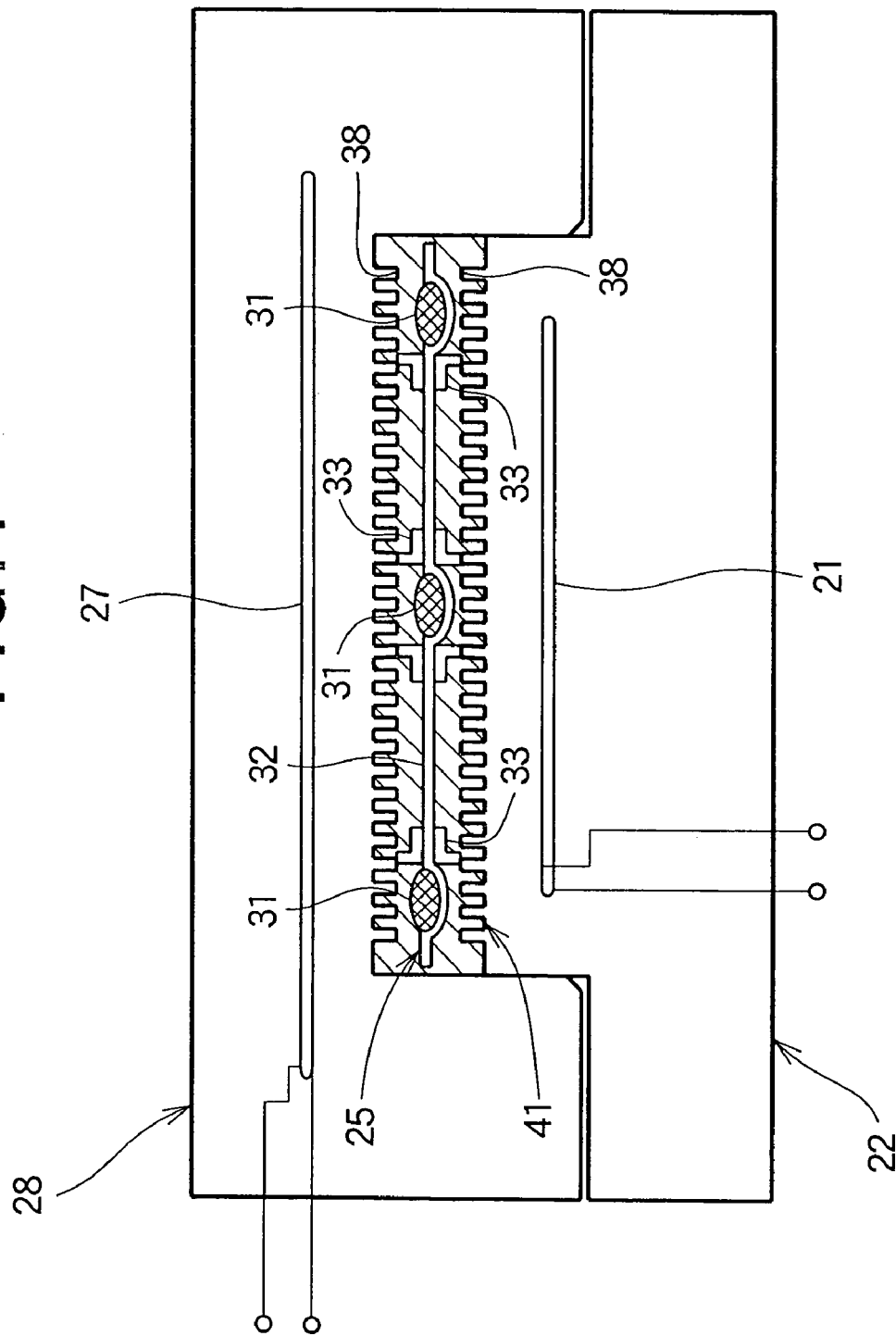
FIG. 4 illustrates the mold of FIG. 3 in a closed state.

FIG. 3 and FIG. 4 show a manufacturing apparatus used in a fuel cell separator manufacturing method according to this first embodiment of the invention.

First, a preform 17 is placed on a molding face 23 of a lower separator-molding die 22 having a heater 21; a water passage forming member 25 for forming cooling water passages in the separator is placed on this preform 17; and another preform 17 is placed on this water passage forming member 25. Then, from above the lower separator-molding die 22, an upper separator-molding die 28 having a heater 27 is lowered, and the upper separator-molding die 28 is mated with the lower separator-molding die 22.

The water passage forming member 25 has multiple cores 31 and a holding plate 32 serving as a holding member made of a light metal with a high thermal conductivity, for example an aluminum alloy, holding these cores 31, and multiple positioning members 33 for positioning this holding plate 32 in the cavity. Numerous tongue parts 35 for forming gas flow grooves for fuel gas or oxidant gas to flow through are formed at a fixed spacing on the molding face 23 of the lower separator-molding die 22. Numerous similar tongue parts 36 are formed also on the molding face of the upper molding die 28.

As shown in FIG. 4, while the lower separator-molding die 22 and the upper separator-molding die 28 are heated with the heaters 21, 27, the preforms 17, 17 and the water passage forming member 25 shown in FIG. 3 are press-molded en bloc to make a with-core separator 41 having numerous gas flow grooves 38, 38 formed in both its sides.

FIG. 5 shows a procedure for annealing a fuel cell separator of the invention.

ST11: The separator is sandwiched between straightening plates.

ST12: The separator is heated while sandwiched between the straightening plates.

ST13: At the time of cooling of the separator, the straightening plates are tightened, and the separator is straightened by being held under pressure.

The annealing and core-removal of the first embodiment described above will now be explained in detail on the basis of FIG. 6A to FIG. 7B.

FIGS. 6A and 6B show an apparatus for annealing and core-removal according to the first embodiment.

In FIG. 6A and FIG. 6B, of an upper/lower pair of straightening plates. 48, 43 for straightening with-core separators 41, multiple bolts 44 are mounted to the four corners and the length-direction center of the lower-side straightening plate 43, which is disposed on a lower side; the output shaft 46 of a motor 45 is mounted to the center part; and with-core separators 41, 41 are placed in line on the lower-side straightening plate 43 so that the cores 31 of the with-core separators 41 lie in the length direction of the lower-side straightening plate 43. The output shaft 46 has a male thread on its end.

As shown in FIG. 7A, the upper-side straightening plate 48, which has holes opened in positions corresponding to the positions of the bolts 44 and the output shaft 46 on the lower-side straightening plate 43, is placed on the with-core separators 41, 41 with the bolts 44 and the output shaft 46 passing through the holes. Then, nuts 51 are screwed onto the bolts 44 and provisionally tightened to a degree such that the with-core separators 41, 41 are not loose. And, a nut 52 is screwed onto the output shaft 46.

In FIG. 7B, coils 53 are brought close to each of the lower-side straightening plate 43 and the upper-side straightening plate 48, and by the motor 45 being operated to rotate the output shaft 46, the with-core separators 41, 41 sandwiched between the lower-side straightening plate 43 and the upper-side straightening plate 48 are rotated. Then, by electricity being passed through the coils 53, when the cores 31 are made of a dielectric material, inductive heating is made to occur by an induced current being made to arise in the cores 31 inside the with-core separators 41, 41. As the cores 31 having reached their melting point melt, they are discharged from inside the separators 41 to outside by centrifugal force. In this way, cooling water passages 54 are formed in the parts from which the cores 31 were discharged.

When all of the cores 31 have discharged from the separators, the motor 45 is stopped to stop the rotation of the separators, and the supply of electricity to the coils 53 is stopped to stop the heating. Then, the nuts 51 (6 places) are tightened, and the separators with their cores removed are held under pressure for a predetermined time at a predetermined load. When the predetermined time has elapsed, the nuts 51 are loosened to release the pressuring of the separators, and straightening of the separators is ended.

The inductive heating mentioned above is a method wherein a dielectric material is disposed between two coils and by a high-frequency alternating voltage being applied across the coils an induced current is made to arise inside the dielectric material and by this induced current the dielectric material itself is made to produce heat and is heated up. Accordingly, with inductive heating, the dielectric material can be heated in a short time and wholly, and the heating efficiency can be raised.

As shown in FIG. 1, FIG. 3 and FIG. 7B, this invention has it as a characteristic that firstly, in a fuel cell separator manufacturing method wherein a preform 17 is molded from a knead of carbon and thermosetting resin and cooling water passages 54 are formed between adjacent separators using this preform 17, cores 31 for forming the cooling water passages 54 and a holding plate 32 holding these cores 31 are interposed between two preforms 17, 17 and a separator is formed by compression-heating these preforms 17, 17 and the cores 31 and the holding plate 32 en bloc, and the cooling water passages 54 are formed by melting and discharging the cores 31 in a heating step after this.

Because a with-core separator 41 is formed with the cores 31 and the holding plate 32 embedded in it and the cooling water passages 54 are formed by melting and discharging the cores 31, there is no bringing together of two separators such as there has been in related art, and a seal becomes unnecessary. Consequently, in addition to dispensing with a seal member, it is possible to cut out man-hours spent studying specifications such as the thickness, shape and material of the seal member, and the manufacturing cost of the fuel cell can be reduced.

Also, because the cores 31 and the holding plate 32 are interposed between two preforms 17, 17 and the preforms 17, 17, the cores 31 and the holding plate 32 are compressed and heated en bloc and the cores 31 are melted and discharged in a heating step after this, the embedding of the cores 31 in the separator and the removal of the cores 31 can be carried out easily, and the cooling water passages 54 can be formed easily.

Also, because there ceases to be any bringing together of separators, electrical contact resistance does not arise, and output decrease of the fuel cell can be prevented.

In this embodiment, when the cores 31 are made a low-melting-point metal, the cores 31 can be melted easily, and after melting they can be discharged from inside the separator easily, and the manufacturability of the separator can be raised. And, the low-melting-point metal discharged from inside the separator can be used to make cores any number of times, and material cost can be suppressed.

Also, in this embodiment, when the heating process of after the with-core separator 41 is molded is made an annealing process, because the cores 31 are melted and discharged in the heating process of annealing, a special heating process does not have to be provided for melting the cores 31, and the manufacturing labor of the separator can be reduced.

Figure 8:
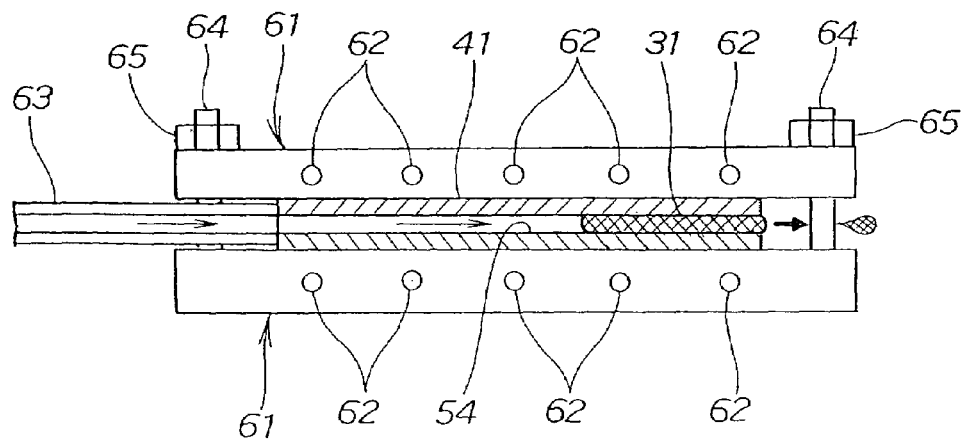
FIG. 8 is a view showing annealing and core-discharging according to a second embodiment of the invention being carried out.

FIG. 8 shows an apparatus for annealing and core-removal according to a second embodiment of the invention. Parts the same as in the apparatus of the first embodiment shown in FIG. 7A and FIG. 7B have been given the same reference numerals and their description will be omitted.

First, a with-core separator 41 is sandwiched with a pair of straightening plates 61, 61, and the cores 31 are heated with a plurality of heaters 62 embedded in these straightening plates 61, 61.

When the cores 31 of the with-core separator 41 have melted, air is injected through an air supply pipe 63 attached to one of the side faces of the separator 41 and blown into the separator 41 and discharges the melted cores 31 to outside.

When the cores 31 have all discharged from the separator 41, the supply of electricity to the heaters 62 is stopped; nuts 65 screwed onto bolts 64 are tightened; and the separator having had the cores removed is held under pressure for a predetermined time at a predetermined load to straighten the separator.

Figure 9:
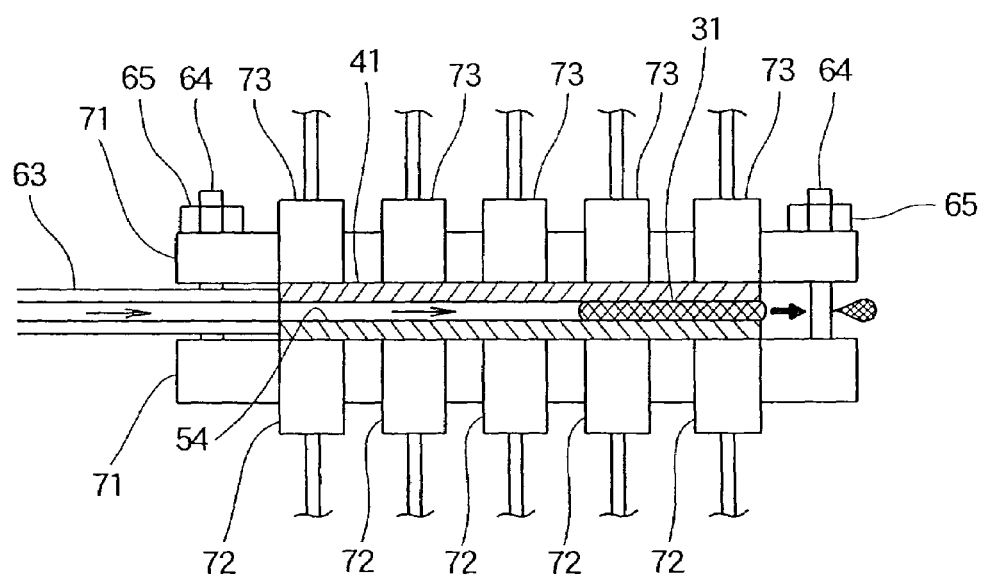
FIG. 9 is a view showing a third embodiment of annealing and core-discharging of the invention.

FIG. 9 shows an apparatus for annealing and core-removal according to a third embodiment of the invention. Parts the same as in the first embodiment and the second embodiment have been given the same reference numerals and their description will be omitted.

First, a with-core separator 41 is sandwiched between a pair of straightening plates 71, 71; electricity is passed between multiple lower electrodes 72 and upper electrodes 73 mounted to these straightening plates 71, 71; and a current is made to flow directly through the separator 41, whereby resistance heating (specifically, direct resistance heating) of the with-core separator 41 is carried out.

When the cores 31 of the with-core separator 41 have melted, air is injected through an air supply pipe 63 attached to a side face of the separator 41, and is blown into the separator 41 and discharges the melted cores 31 to outside.

When the cores 31 have all discharged from the separator 41, the supply of electricity to the lower electrodes 72 and the upper electrodes 73 is stopped; the nuts 65 screwed onto the bolts 64 are tightened; and the separator having had the cores removed is held under pressure for a predetermined time at a predetermined load to straighten the separator.

FIG. 10A to FIG. 11B show a manufacturing apparatus used in a fuel cell separator manufacturing method according to a fourth embodiment of the invention. Parts the same as in the first embodiment have been given the same reference numerals and their description will be omitted.

Figure 10A:
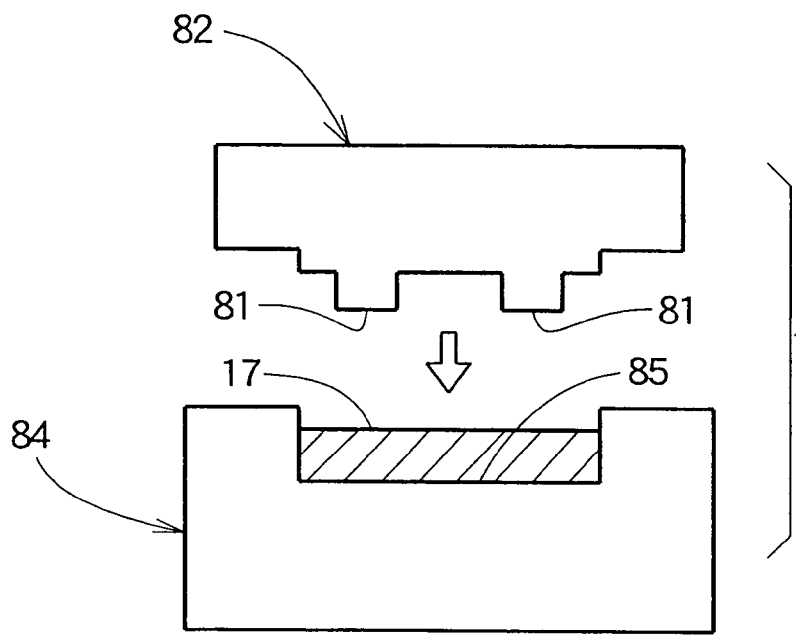
FIG. 10A and FIG. 10B are views showing, of a fuel cell separator manufacturing method according to a fourth embodiment of the invention, a preform molding state.

In FIG. 10A, there are provided an upper preform molding die 82, having channel-forming projecting parts 81, 81 for forming core channels 87, 87 in a preform 17 (see FIG. 10B), and a lower preform molding die 84, having a placement surface 85. A preform 17 is placed on the placement surface 85 of the lower preform molding die 84, and the upper preform molding die 82 is lowered as shown by the arrow.

Figure 10B:
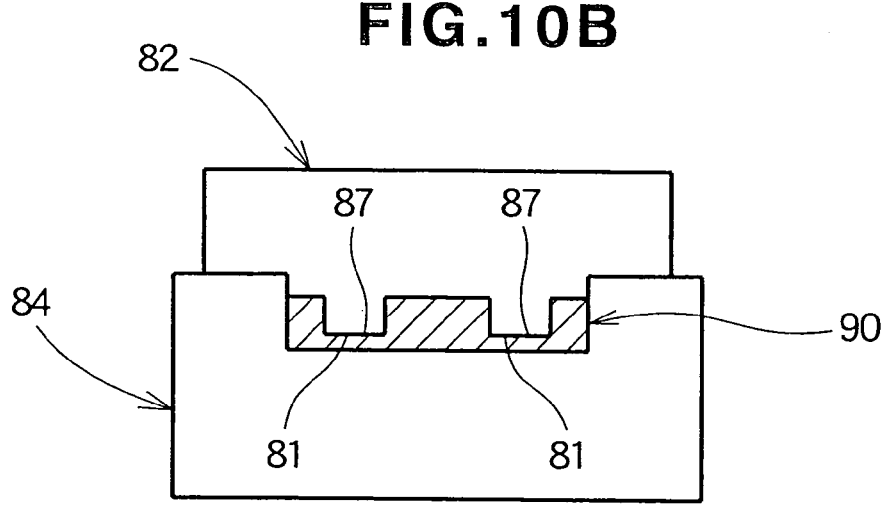

In FIG. 10B, core channels 87, 87 are formed in the preform by the channel-forming projecting parts 81, 81 of the upper preform molding die 82, and a preform 90 having these core channels 87 is obtained.

Figure 11A:
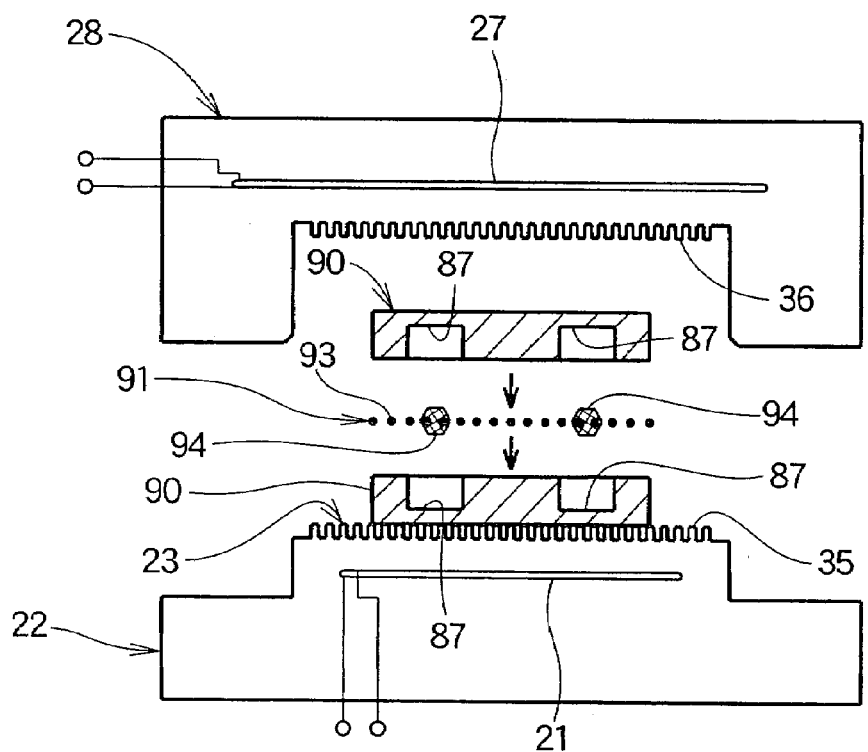
FIG. 11A and FIG. 11B are views showing a step for manufacturing a separator with a mold using a preform molded in FIG. 10A and FIG. 10B.

In FIG. 11A, the preform 90 is placed on a molding face 23 of a lower separator-molding die 22; a water passage forming member 91 for forming cooling water passages in the separator is placed on this preform 90; and another preform 90 is placed on this water passage forming member 91. Then, from above the lower separator-molding die 22 the upper separator-molding die 28 is lowered, and the upper separator-molding die 28 is mated with the lower separator-molding die 22.

The water passage forming member 91 is made up of a wire mesh 93 made of a low-melting-point metal and serving as a holding member, and bar-shaped cores 94, 94 made of a low-melting-point metal and formed integrally with this wire mesh 93. When the water passage forming member 91 is placed on the preform 90, the cores 94, 94 are received in the core channels 87, 87 of the preform 90.

The wire mesh 93 is for making fusion good and promoting integration of the preforms 90, 90 during the press-molding of the preforms 90, 90, which will be explained next.

Figure 11B:
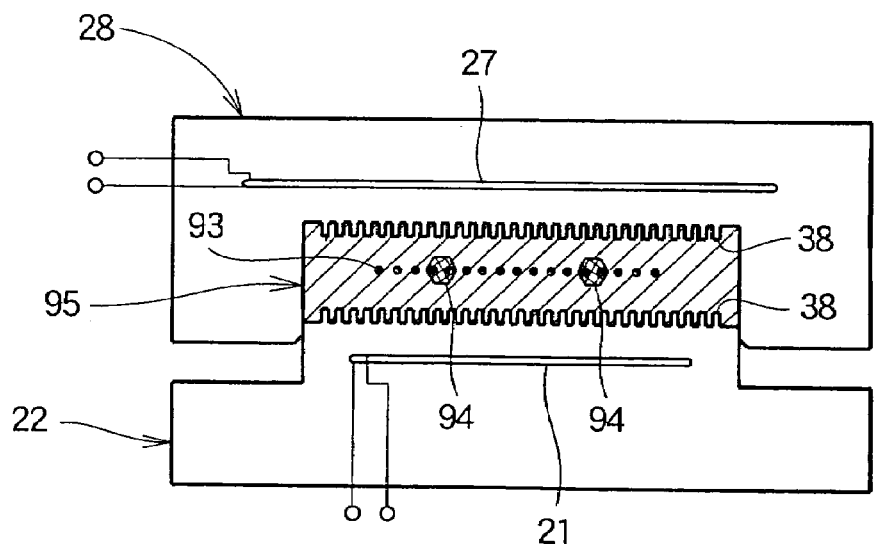

In FIG. 11B, while the lower separator-molding die 22, the upper separator-molding die 28 and the preforms 90, 90 are heated with heaters 21, 27, the preforms 90, 90 and the water passage forming member 91 are press-molded en bloc, and a with-core separator 95 having gas flow grooves 38, 38 in both its sides is made.

Subsequent annealing and core-removal of this with-core separator 95 is the same as in the first to third embodiments, and an explanation thereof will be omitted.

The wire mesh 93 is melted and discharged in the same way as the cores 94.

FIG. 12A to FIG. 13B show a manufacturing apparatus used in a fuel cell separator manufacturing method according to a fifth embodiment of the invention. Parts the same as in the first embodiment have been given the same reference numerals and their description will be omitted.

Figure 12A:
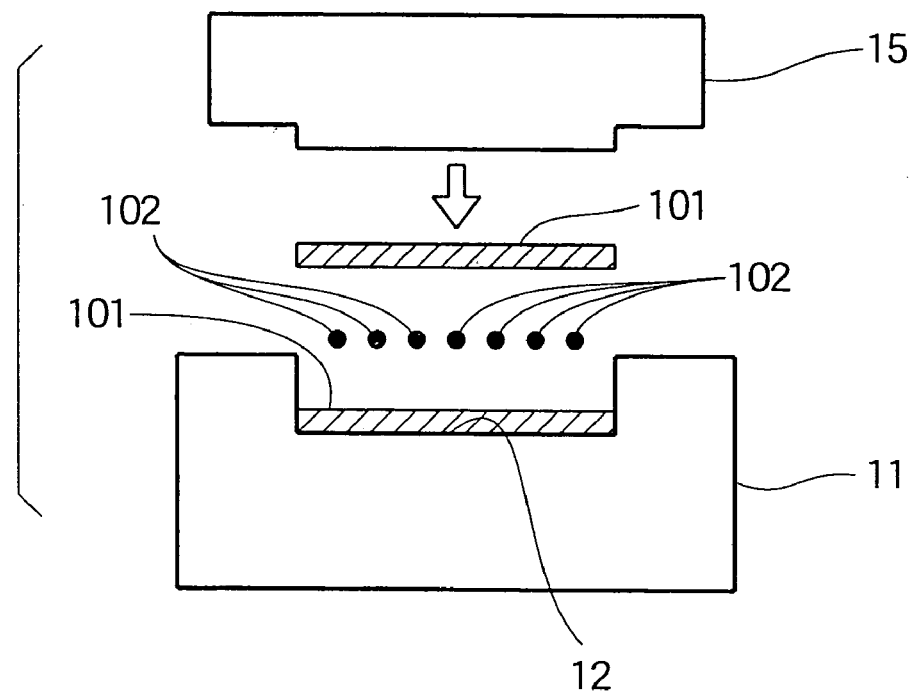
FIG. 12A and FIG. 12B are views showing, of a fuel cell separator manufacturing method according to a fifth embodiment of the invention, a step of manufacturing a with-core preform.

In FIG. 12A, a preform 101 is placed on a molding face 12 of a lower preform molding die 11; multiple water passage forming rods 102 serving as cores made of a low-melting-point metal for forming cooling water passages in the separator are placed on this preform 101; and another preform 101 is placed on these water passage forming rods 102. Then, an upper preform molding die 15 is lowered from above the lower preform molding die 11 as shown by the arrow, and the upper preform molding die 15 is mated with the lower preform molding die 11.

Figure 12B:
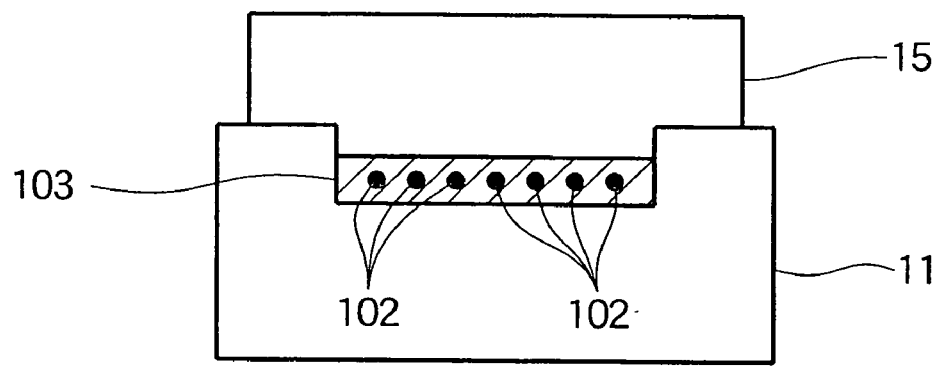

In FIG. 12B, the preforms 101, 101 and water passage forming rods 102 shown in FIG. 12A are press-molded en bloc to make a with-core preform 103.

Figure 13A:
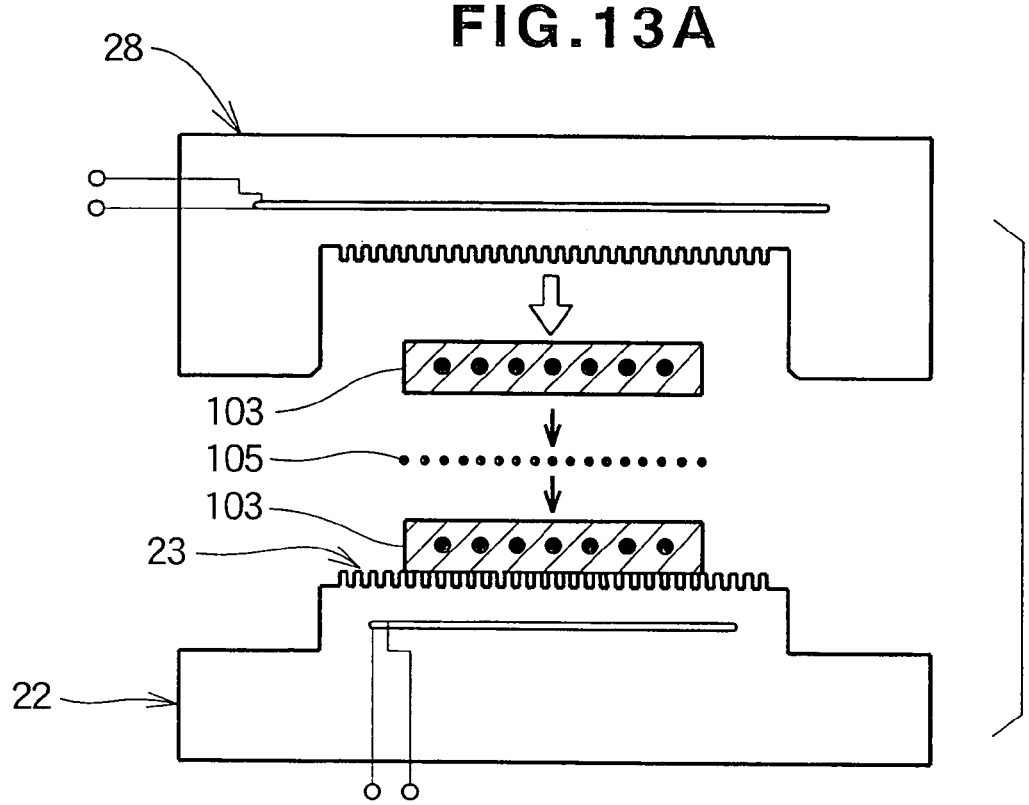
FIG. 13A and FIG. 13B are views showing a step of manufacturing a separator with a mold using a preform molded in FIG. 12A and FIG. 12B.

As shown in FIG. 13A, the with-core preform 103 is placed on the molding face 23 of a lower separator-molding die 22; a wire mesh 105 made of a low-melting-point metal is placed on this with-core preform 103; and another with-core preform 103 is placed on this wire mesh 105. Then, an upper separator-molding die 28 is lowered from above the lower separator-molding die 22 as shown with an arrow, and the upper separator-molding die 28 is mated with the lower separator-molding die 22.

The wire mesh 105 is for making fusion good and promoting integration of the with-core preforms 103, 103 during the press-molding of the with-core preforms 103, 103, which will be explained next.

Figure 13B:
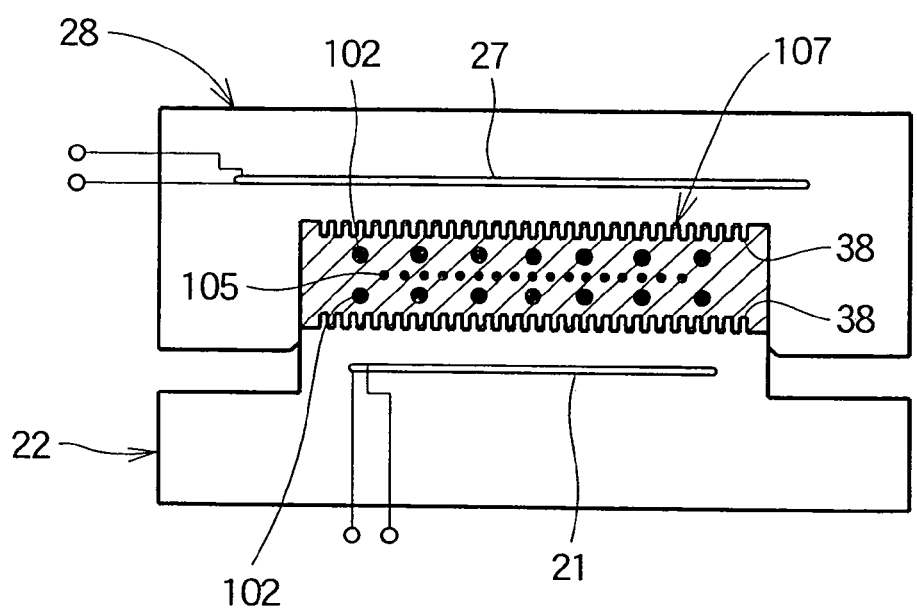

As shown in FIG. 13B, while the lower separator-molding die 22, the upper separator-molding die 28 and the with-core preforms 103, 103 (see FIG. 13A) are heated with heaters 21, 27, the with-core preforms 103, 103 and the wire mesh 105 are press-molded en bloc, and a with-core separator 107 having gas flow grooves 38, 38 in both its sides is made.

Subsequent annealing and core-removal of this with-core separator 107 is the same as in the first to third embodiments, and a description thereof will be omitted.

The wire mesh 105 is melted and discharged in the same way as the water passage forming rods 102.

The thermosetting resin constituting the separator is for example a phenol resin with a setting temperature of about 190° C. and an annealing temperature of about 170° C.

For the cores, a resin, a wax or a low-melting-point metal or the like which melts in the range of 210° C. to 240° C. can be appropriately selected, and in the case of a low-melting-point metal an Sn—Ag—Cu alloy whose melting point is 220° C., or Sn, whose melting point is 230° C., is suitable.

In the first embodiment of this invention an example was shown wherein the cores are heated by inductive heating and discharged by centrifugal force, and in the second embodiment an example was shown wherein the cores are heated indirectly by heaters and discharged with compressed air; however, the invention is not limited to this, and the cores may alternatively be heated by inductive heating and discharged with compressed air, or the cores may be heated with heaters and discharged with centrifugal force.

Also, in the third embodiment, although an example was shown wherein the cores are heated directly by electricity being passed through them and are discharged with compressed air, the invention is not limited to this, and alternatively the cores may be heated directly by electricity being passed through them and discharged with centrifugal force.

And also, in the fifth embodiment, although an example was shown wherein water passage forming rods constituting cores were embedded in the preform and two of these preforms were compression-molded to mold a separator, the invention is not limited to this, and alternatively water passage forming rods may be interposed directly between two preforms (for example the preform 17 shown in FIG. 2B) and compression-molded en bloc to mold the separator.

FIG. 14 to FIG. 21 show a sixth embodiment of a fuel cell separator manufacturing method according to the invention.

Figure 14:
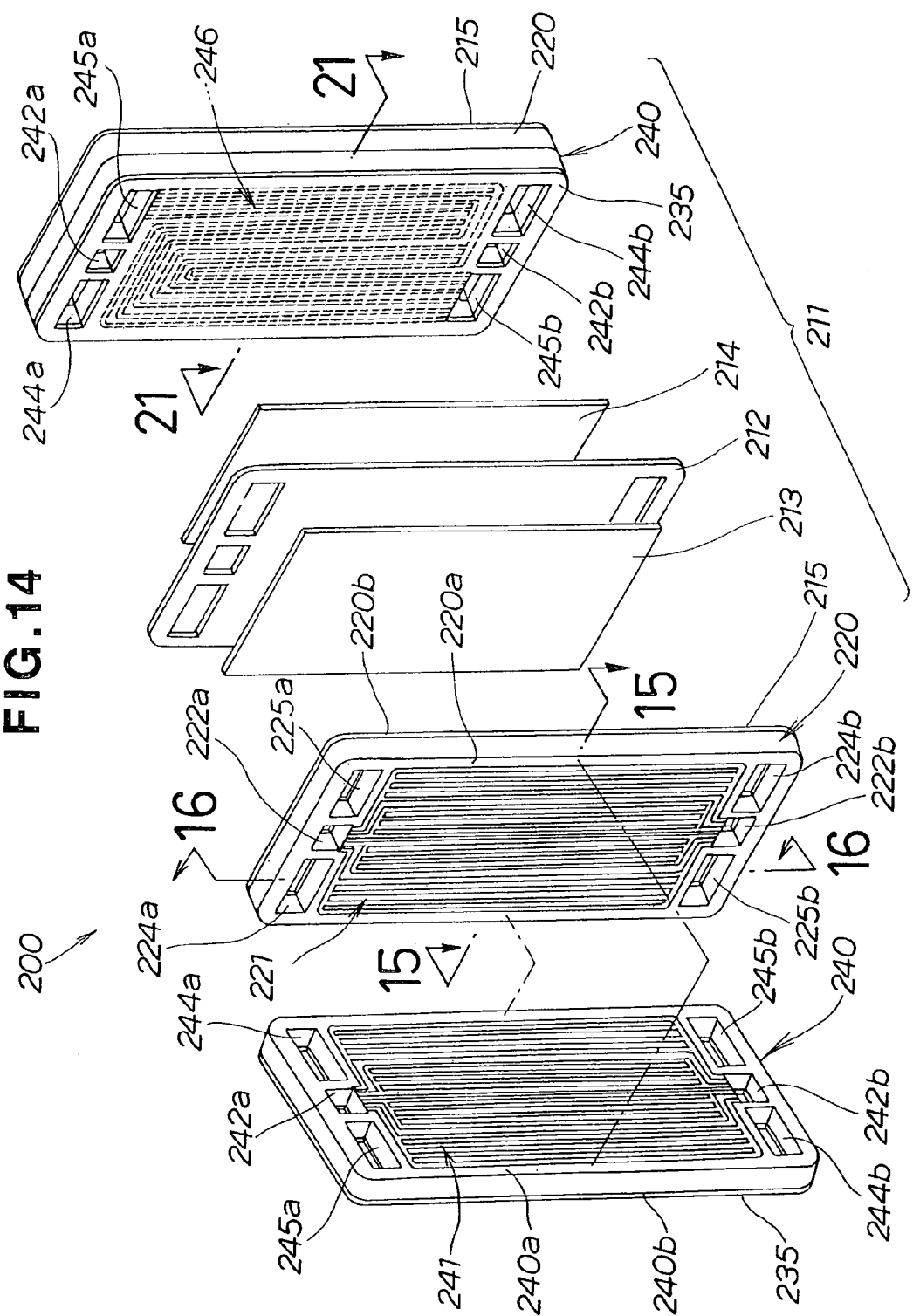
FIG. 14 is an exploded perspective view of a fuel cell manufactured by a fuel cell separator manufacturing method according to a sixth embodiment of the invention
Figure 15:
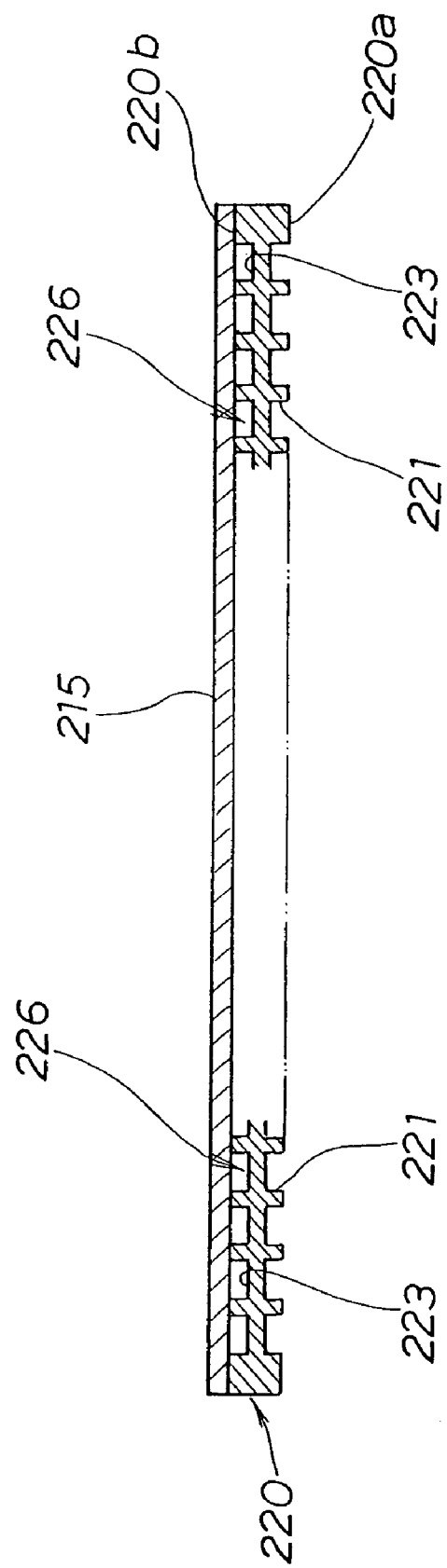
FIG. 15 is a sectional view taken along line 15—15 of FIG. 14.
Figure 16:
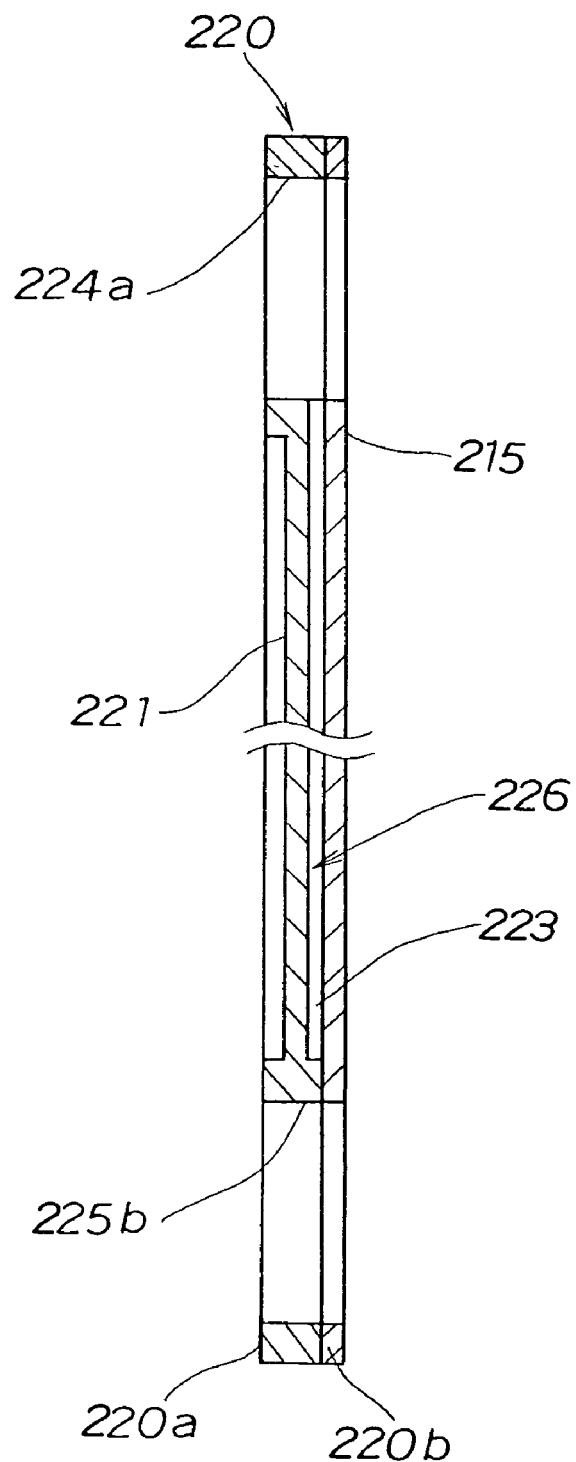
FIG. 16 is a sectional view taken along line 16—16 of FIG. 14.

Referring to FIG. 14 to FIG. 16, a fuel cell 200 is a solid polymer type fuel cell, and is made up of numerous, stacked cell modules 211. Each of the cell modules 211 has an electrolyte film 212, an anode electrode 213, a cathode electrode 214, a first separator 220 and a second separator 240. As the electrolyte film 212, as an example, a solid polymer electrolyte film can be used. This electrolyte film 212 is sandwiched by the anode electrode 213 and the cathode electrode 214. The first separator 220 is disposed on the outer side face of the anode electrode 213, with an anode electrode diffusion layer 215 therebetween. The second separator 240 is disposed on the outer side face of the cathode electrode 214, with a cathode electrode diffusion layer 235 therebetween.

Figure 21:
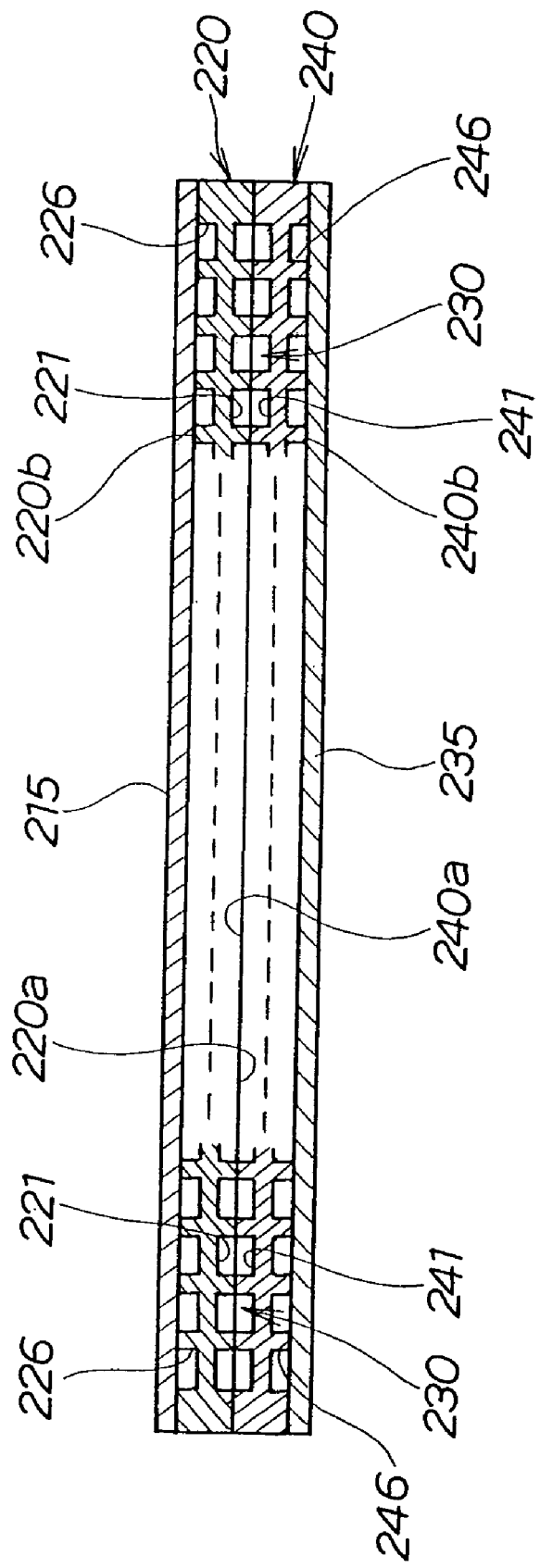
FIG. 21 is a sectional view taken along line 21—21 of FIG. 14 and shows a first separator and a second separator brought together.

When adjacent cell modules 211, 211 are stacked, the first separator 220 of one of the cell modules 211 and the second separator 240 of the other of the cell modules 211 are brought together at cooling water passage formation faces 220a, 240a of the first and second separators 220, 240. As a result of this, numerous cooling water passages 230 shown in FIG. 21 are formed by numerous cooling water passage grooves 221 formed in the first separator 220 and numerous cooling water passage grooves 241 formed in the second separator 240. These cooling water passages 230 connect with cooling water supply openings 222a, 242a formed in the centers of top parts of the first and second separators 220, 240 and also connect with cooling water discharge openings 222b, 242b formed in the centers of bottom parts of the first and second separators 220, 240.

The first separator 220 has numerous fuel gas passages (gas passages) 226 in a fuel gas passage formation face 220b, as shown in FIG. 15, by the anode electrode diffusion layer (electrode diffusion layer) 215 being bonded integrally to (that is, integrated with) the fuel gas passage formation face (first separator surface) 220b. These fuel gas passages 223 connect with fuel gas supply openings 224a, 244a formed in the left sides of the top parts of the first and second separators 220, 240, and also connect with fuel gas discharge openings 224b, 244b formed in the right sides of the bottom parts of the first and second separators 220, 240.

The second separator 240 has numerous oxidant gas passages (gas passages) 246 shown in FIG. 21 in an oxidant gas passage formation face 240b, by the cathode electrode diffusion layer (electrode diffusion layer) 235 being bonded integrally to (that is, integrated with) the oxidant gas passage formation face (second separator face) 240b. These oxidant gas passages 246 connect with oxidant gas supply openings 225a, 245a formed in the right sides of the top parts of the first and second separators 220, 240, and also connect with oxidant gas discharge openings 225b, 245b formed in the left sides of the bottom parts of the first and second separators 220, 240.

As the resin constituting the first and second separators 220, 240, a resin composition including 60 to 90 wt % carbon material made by blending natural graphite, artificial graphite, ketjen black, acetylene black or the like singly or mixedly with a thermoplastic resin having resistance to acid can be given as an example.

As the thermoplastic resin having acid resistance, for example ethylene vinyl acetate copolymer, ethylene ethyl acrylate copolymer, straight-chain low-density polyethylene, polyphonylene sulfide, modified polyphenylene oxide and so on can be cited, although the invention is not limited to these.

The first separator 220 has an approximately rectangular shape, and as shown in FIG. 15 has numerous fuel gas passage grooves 223 in a fuel gas passage formation face 220b. By the anode electrode diffusion layer 215 being provided integrally with this fuel gas passage formation face 220b, numerous fuel gas passages 226 are formed by the fuel gas passage grooves 223 and the anode electrode diffusion layer 215. The first separator 220 also has numerous cooling water passage grooves 221 formed in its cooling water passage formation face 220a.

As shown in FIG. 16, the anode electrode diffusion layer 215 is bonded to the fuel gas passage formation face 220b of the first separator 220. As a result, fuel gas passages 226 are formed between the fuel gas passage grooves 223 and the anode electrode diffusion layer 215. These fuel gas passages 226 connect with a fuel gas supply opening 224a formed in the first separator 220.

Next, a fuel cell separator manufacturing method will be described, on the basis of FIG. 17 to FIG. 20C.

First, steps for molding a core 250 for making the fuel gas passages 226 and the cooling water passage grooves 221 with a water-soluble polymer will be explained, on the basis of FIG. 17 to FIG. 18.

FIGS. 17(a) to (c) show a first step of a fuel cell separator manufacturing method according to the sixth embodiment of the invention.

As shown in FIG. 17(a), an anode electrode diffusion layer 215 is set on the moving die 257 of a open core mold 256, and then the moving die 257 is lowered toward a fixed die 258 in the direction of the arrows and the core mold 256 is locked.

Next, as shown in FIG. 17(b), the cavity 256a of the core mold 256 is filled with a molten water-soluble polymer as shown by the arrow [1]. After the water-soluble polymer is allowed to solidify and a core 250 is bonded to (that is, integrated with) the anode electrode diffusion layer 215, the moving die 257 is raised as shown with arrows.

As the water-soluble polymer, for example, polyacrylamide, polyacrylic acid, polymethacrylic acid, polyitaconic acid, polyvinyl alcohol and the like can be given as examples, although the invention is not limited to this. That is, as the water-soluble polymer, any substance which can be used as cores and has water-solubility can be used.

Finally, as shown in FIG. 17(c), the core 250, molded integrally with the anode electrode diffusion layer 215, is removed from the cavity 256a of the core mold 256, opened by raising the moving die 257.

Figure 17:
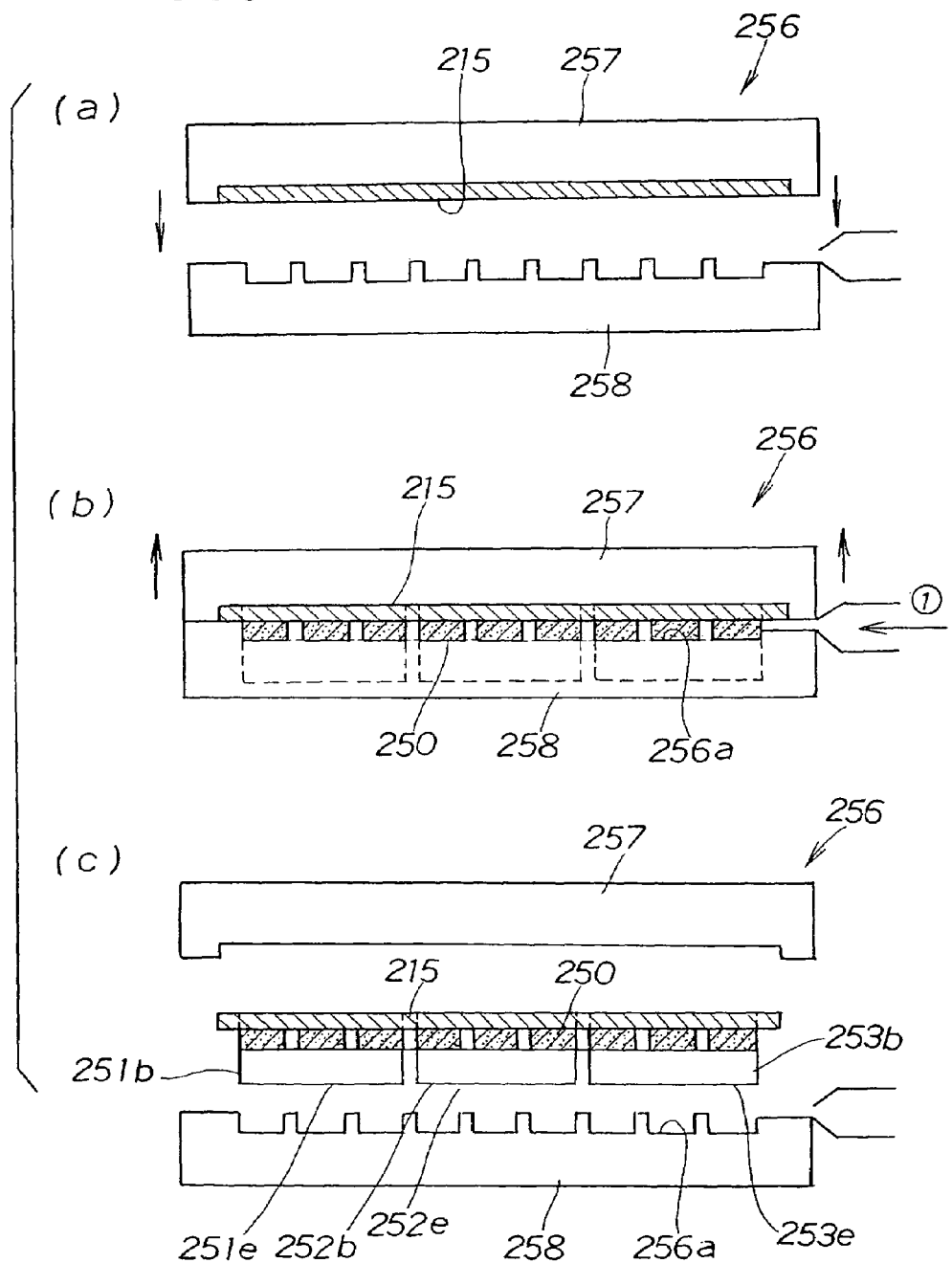
FIG. 17 is a view showing a step of molding a core for forming fuel gas passages and cooling water passage grooves in a fuel cell separator manufacturing method according to the sixth embodiment.
Figure 18:
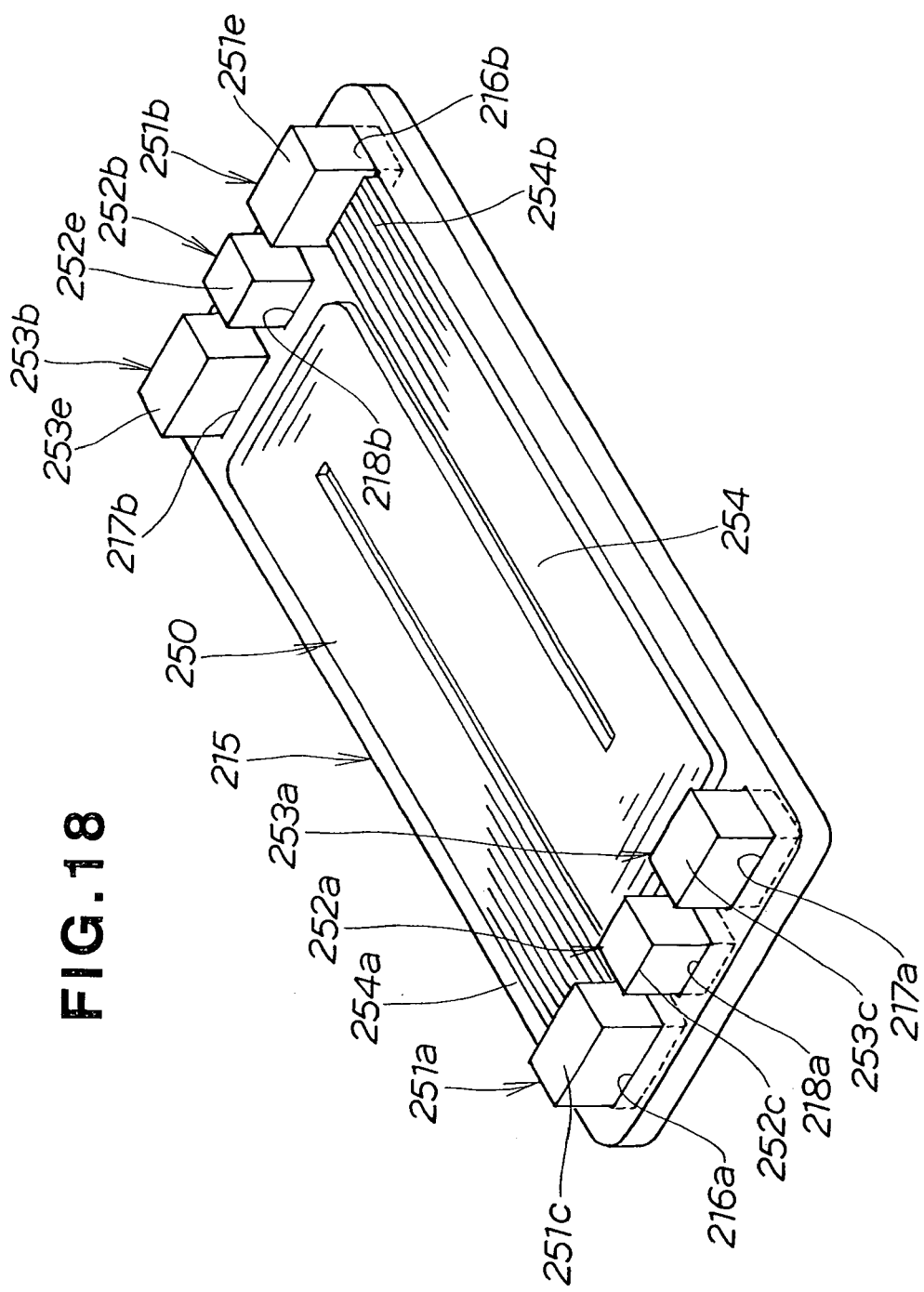
FIG. 18 is a perspective view of a core used in a fuel cell separator manufacturing method according to the sixth embodiment.

FIG. 18 shows a core 250 manufactured by the first step shown in FIG. 17. To make its shape easy to understand, the core 250 is shown facing upward.

The anode electrode diffusion layer 215 has at one end a fuel gas supply opening 216a, a cooling water supply opening 218a and an oxidant gas supply opening 217a, and has at its other end a fuel gas discharge opening 216b, a cooling water discharge opening 218b and an oxidant gas discharge opening 217b.

The fuel gas supply opening 216a, the cooling water supply opening 218a and the oxidant gas supply opening 217a have a fuel gas supply opening core 251a, a cooling water supply opening core 252a and an oxidant gas supply opening core 253a.

The fuel gas discharge opening 216b, the cooling water discharge opening 218b and the oxidant gas discharge opening 217b have a fuel gas discharge opening core 251b, a cooling water discharge opening core 252b and an oxidant gas discharge opening core 253b.

A fuel gas passage core 254 is molded integrally with the anode electrode diffusion layer 215; a supply side 254a of the fuel gas passage core 254 is connected to the fuel gas supply opening core 251a, and a discharge end 254b of the fuel gas passage core 254 is connected to the fuel gas discharge opening core 251b. By this means, the anode electrode diffusion layer 215, the fuel gas supply opening core 251a, the cooling water supply opening core 252a, the oxidant gas supply opening core 253a, the fuel gas discharge opening core 251b, the cooling water discharge opening core 252b, the oxidant gas discharge opening core 253b and the fuel gas passage core 254 can be combined integrally.

The fuel gas supply opening core 251a, the cooling water supply opening core 252a, the oxidant gas supply opening core 253a, the fuel gas discharge opening core 251b, the cooling water discharge opening core 252b, the oxidant gas discharge opening core 253b and the fuel gas passage core 254 constitute the core 250.

When the core 250 and the anode electrode diffusion layer 215 are set in the cavity of a metal mold, the end 251c of the fuel gas supply opening core 251a, the end 252c of the cooling water supply opening core 252a, the end 253c of the oxidant gas supply opening core 253a, the end 251e of the fuel gas discharge opening core 251b, the end 252e of the cooling water discharge opening core 252b and the end 253e of the oxidant gas discharge opening core 253b are placed on the cavity face of the die.

Next, a step of molding a first separator will be described, on the basis of FIG. 19 and FIG. 20.

FIGS. 19(a) and (b) show a second step of a fuel cell separator manufacturing method according to the sixth embodiment.

As shown in FIG. 19(a), the core 250 and the anode electrode diffusion layer 215 are set on the fixed die 261 of a metal mold 260, and a moving die 262 is lowered as shown by the arrows and the metal mold 260 is locked.

As explained with reference to FIG. 18, the core 250 is placed so that the end 251c of the fuel gas supply opening core 251a, the end 252c of the cooling water supply opening core 252a, the end 253c of the oxidant gas supply opening core 253a, the end 251e of the fuel gas discharge opening core 251b, the end 252e of the cooling water discharge opening core 252b and the end 253e of the oxidant gas discharge opening core 253b are placed on a cavity face 263a of the metal mold 260. That is, the core 250 and the anode electrode diffusion layer 215 are set on the cavity face 263a of the fixed die 261.

Because the supply opening cores 251a, 252a, 253a and the discharge opening cores 251b, 252b, 253b can be used to dispose the core 250 in the cavity 263 like this, a core-supporting member such as a chaplet, which is normally necessary for disposing the core 250 in the cavity 263, can be made unnecessary. When a core-supporting member is used, there is a risk that after the inside of the cavity 263 is filled with resin and the separator is molded the core-supporting member part will remain in the separator as a gap. At this time it is necessary to fill the remaining gap with a sealant such as a silicon agent, but with the sixth embodiment there is no such necessity.

In FIG. 19(b), by closing the metal mold 260, the core 250 is disposed in the cavity 263 of the metal mold 260 and the anode electrode diffusion layer 215 is disposed in a gap between the core 250 and a cavity face 263b of the moving die 262. In this state, the cavity 263 is filled with molten resin as shown by the arrow [2]. After this the molten resin inside the cavity 263 is allowed to solidify.

FIGS. 20(a) to (c) show a third step of a fuel cell separator manufacturing method according to the sixth embodiment.

By the molten resin being allowed to solidify, as described above, the first separator 220 is formed integrally with the core 250 and the anode electrode diffusion layer 215. After that, as shown in FIG. 20(a), the moving die 262 is raised to open the metal mold 260, and the first separator 220, the core 250 and the anode electrode diffusion layer 215 are removed from inside the cavity 263.

Next, the first separator 220, the core 250 and the anode electrode diffusion layer 215 removed from the inside the cavity are immersed in water 266 held in a water tank 265, as shown in FIG. 20(b). As a result, the core 250 is dissolved in the water and the core 250 is dissolved out from inside the first separator 220. The core 250 can be dissolved in water as a result of the core 250 being molded with a water-soluble polymer. Because the equipment for dissolving the core 250 can consequently be made simple, it is possible to suppress equipment expenditure and achieve cost reductions.

Finally, the first separator 220 and the anode electrode diffusion layer 215 are removed from the water tank 265. The first separator 220 so removed, as shown in FIG. 20(c), has fuel gas passages 226 formed in it as a result of the core 250 being dissolved. The cooling water passage grooves 221 of the first separator 220 are molded by the cavity face 263a of the fixed die 261 shown in FIG. 20(a). By this means, a first separator 220 formed integrally with an anode electrode diffusion layer 215 is obtained.

The second separator 240 formed integrally with the cathode electrode diffusion layer 235 shown in FIG. 1 can also be obtained by sequentially carrying out the steps shown in FIG. 17 to FIG. 20, in the same way as the first separator 220.

A first separator 220 having an anode electrode diffusion layer 215 and a second separator 240 having a cathode electrode diffusion layer 235 obtained in this way are brought together as shown in FIG. 21. That is, the cooling water passage formation faces 220a, 240a of first and second separators 220, 240 are brought together, and the first separator 220 and the second separator 240 are bonded. And consequently, cooling water passages 230 are formed by the cooling water passage grooves 221 in the first separator 220 and the cooling water passage grooves 241 in the second separator 240.

Also, by the first separator 220 being molded integrally with the anode electrode diffusion layer 215, numerous fuel gas passages 226 are formed at its fuel gas passage formation face 220b. And by the second separator 240 being molded integrally with the cathode electrode diffusion layer 235, numerous oxidant gas passages 246 are formed at its oxidant gas passage formation face 240b.

As described above, in this sixth embodiment, a core 250 is made of a water-soluble polymer, and numerous fuel gas passages 226 are molded in a first separator 220 with this core 250. That is, numerous fuel gas passages 226 can be formed by dissolving the core 250 with water 266 after the molding of the first separator 220.

And also for a second separator 240, in the same way as for the first separator 220, a core is made of a water-soluble polymer and numerous oxidant gas passages 246 are molded in the second separator 240 with this core. That is, numerous fuel gas passages 246 can be formed by dissolving the core with water 266 after the molding of the second separator 240.

Because the cores inside the first and second separators 220, 240 can be dissolved with water 266 like this, the fuel gas passages 226 and the oxidant gas passages 246 of the first and second separators 220, 240 can be formed simply.

Also, the first and second separators 220, 240 are formed integrally with the anode electrode diffusion layer 215 and the cathode electrode diffusion layer 235 respectively. By this means it is possible to suppress electrical contact resistance between the first separator 220 and the anode electrode diffusion layer 215 and it is possible to suppress electrical contact resistance between the second separator 240 and the cathode electrode diffusion layer 235. By suppressing electrical contact resistance like this, it is possible to reduce over-voltage and prevent output decrease of the fuel cell.

Next, the over-voltage (resistance over-voltage) accompanying electrical contact resistance described in the sixth embodiment will be explained, on the basis of Table 1 below.

TABLE 1

|  |  | First Comparison Example | Sixth Embodiment |
|---|---|---|---|
| Cell Module Temp. | | 80° C. | 80° C. |
| Anode Gas | | fuel gas (pure $H_2$) | fuel gas (pure $H_2$) |
| Cathode Gas | | oxidant gas (air) | oxidant gas (air) |
| Gas Temp. | anode | 80° C. | 80° C. |
| | cathode | 80° C. | 80° C. |
| Gas Pressure | anode | 50 kPa | 50 kPa |
| | cathode | 100 kPa | 100 kPa |
| Current Density | | 0.883 A/cm$^2$ | 0.883 A/cm$^2$ |
| Result | | resistance over-voltage of sixth embodiment decreased by 0.014 V per cell module compared to first comparison example | |

The first comparison example is a structure made by bringing an anode electrode diffusion layer together into contact with a first separator without integrating the anode electrode diffusion layer with the first separator.

The sixth embodiment is a structure made by integrating an anode electrode diffusion layer with a first separator.

The resistance over-voltages of the first comparison example and the sixth embodiment were measured under the following conditions.

That is, the cell module temperature was set to 80° C. and pure $H_2$ was supplied as the anode gas (the fuel gas), and air was supplied as the cathode gas (the oxidant gas).

The anode side fuel gas temperature was made 80° C. and the cathode side oxidant gas temperature was made 80° C., and the anode side fuel gas pressure was made 50 kPa and the cathode side oxidant gas pressure was made 100 kPa. Under these conditions, a current of current density 0.883 $A/cm^2$ was passed.

The result of this was that the resistance over-voltage of the sixth embodiment was reduced by 0.014 V per cell module compared to the resistance over-voltage of the first comparison example. Accordingly, it can be seen that, by integrating the first separator and the anode electrode diffusion layer as in the sixth embodiment, it is possible to reduce resistance over-voltage and prevent output decrease of the fuel cell.

Next, a fuel cell separator manufacturing method according to a seventh embodiment will be described, on the basis of FIGS. 22(*a*) to (*c*). In this seventh embodiment parts the same as in the sixth embodiment have been given the same reference numerals and their description will be omitted.

Figure 22:
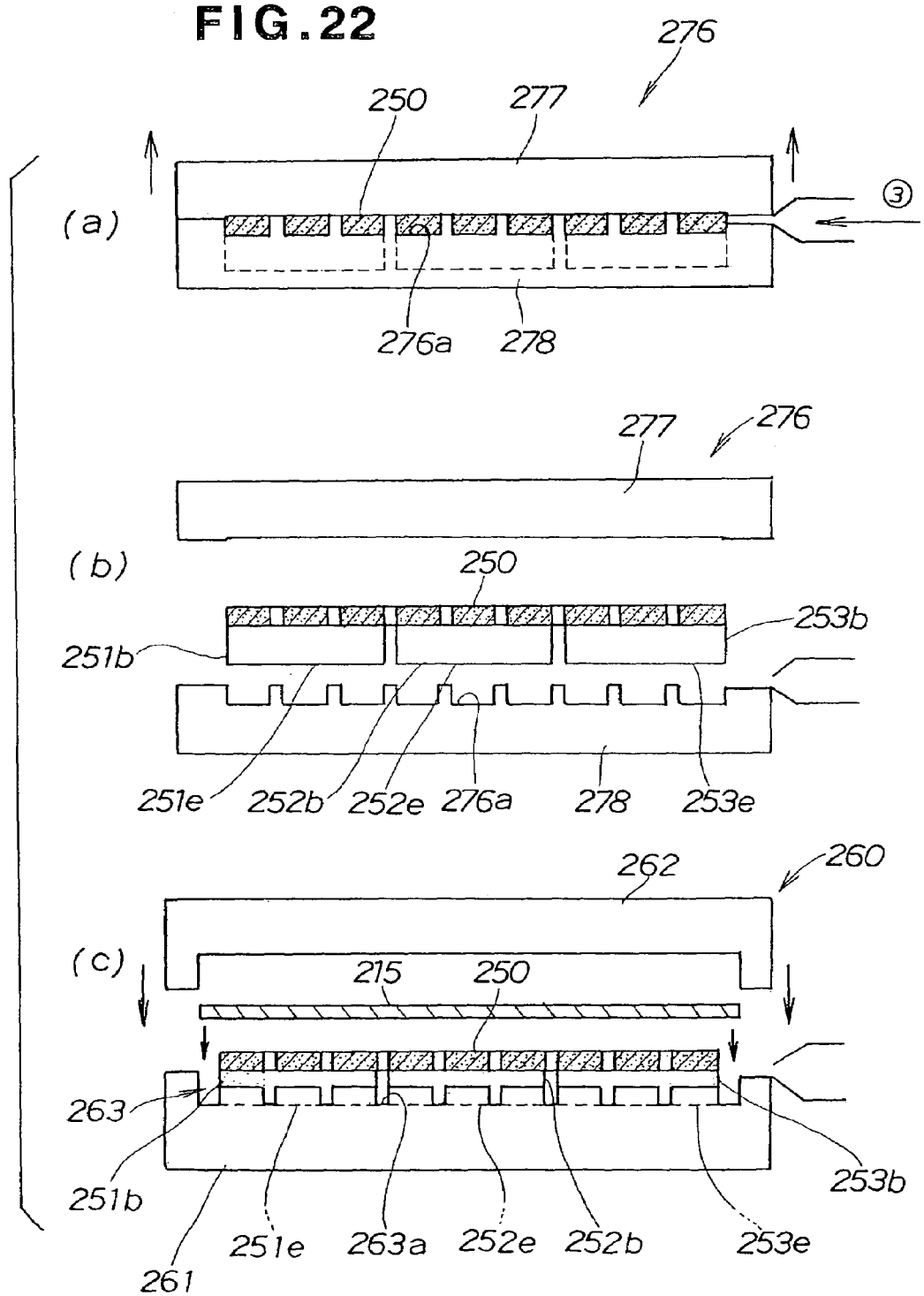
FIG. 22 is a view showing, of a fuel cell separator manufacturing method according to a seventh embodiment of the invention, a step of molding a core.

As shown in FIG. 22(*a*), with a core mold 27*b* locked, the cavity 276*a* of the open core mold 276 is filled with a molten water-soluble polymer as shown by the arrow [3]. After the water-soluble polymer is allowed to solidify, whereby a core 250 is molded, a movable die 277 is raised as shown by the arrows.

Next, as shown in FIG. 22(*b*), the core 250 is removed from the cavity 276*a* of the core mold 276, opened by the raising of the movable die 277.

Finally, as shown in FIG. 22(*c*), the core 250 is set in a fixed die 261 of a metal mold 260, and after that, the anode electrode diffusion layer 215 is placed on the core 250 as shown with arrows. After the core 250 and the anode electrode diffusion layer 215 are set in the cavity 263 like this, a moving die 262 is lowered as shown with arrows to close the metal mold 260.

Figure 19:
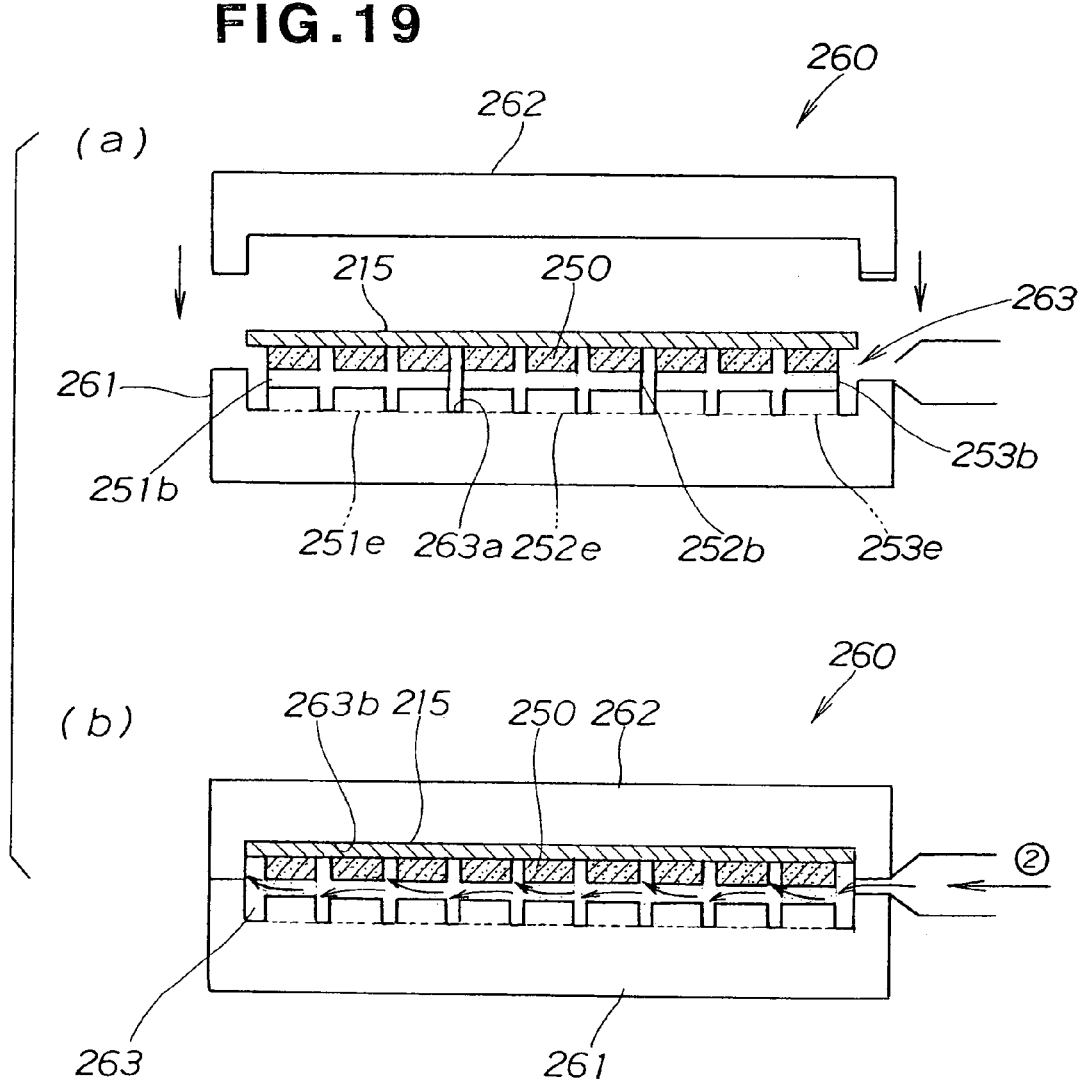
FIG. 19 and FIG. 20 are views showing a step of molding a first separator in a method of a sixth embodiment.
Figure 20:
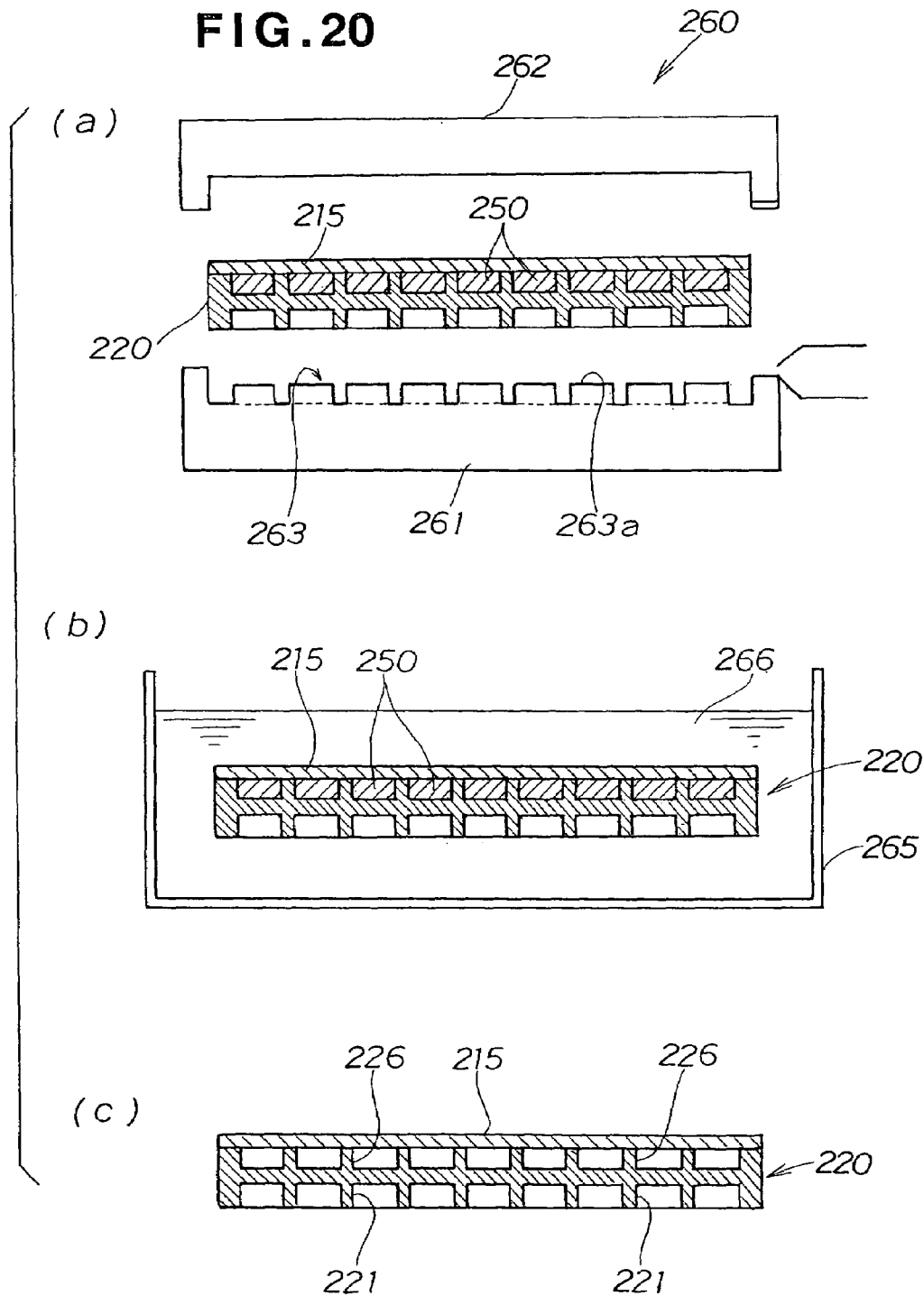

As a result, the state of FIG. 19(*b*) of the sixth embodiment is reached. Thereafter, by repeating the same steps as in the sixth embodiment in order, a first separator 220 formed integrally with the anode electrode diffusion layer 215 shown in FIG. 14 is obtained.

Also, by the same step as that of FIG. 22, a second separator 240 formed integrally with the cathode electrode diffusion layer 235 shown in FIG. 14 is obtained.

In this way, with this seventh embodiment, the same effects as those of the sixth embodiment can be obtained.

Also, with the fuel cell separator manufacturing method of the seventh embodiment, the core 250 can be molded separately from the anode electrode diffusion layer 215. In this way, because the core 250 molding method of either of the sixth and seventh embodiments can be suitably selected, the freedom of design can be increased.

Next, a fuel cell separator manufacturing method according to an eighth embodiment of the invention will be described, on the basis of FIG. 23 to FIG. 29. In describing the eighth embodiment, parts the same as in the sixth embodiment have been given the same reference numerals and their explanation will be omitted.

Figure 23:
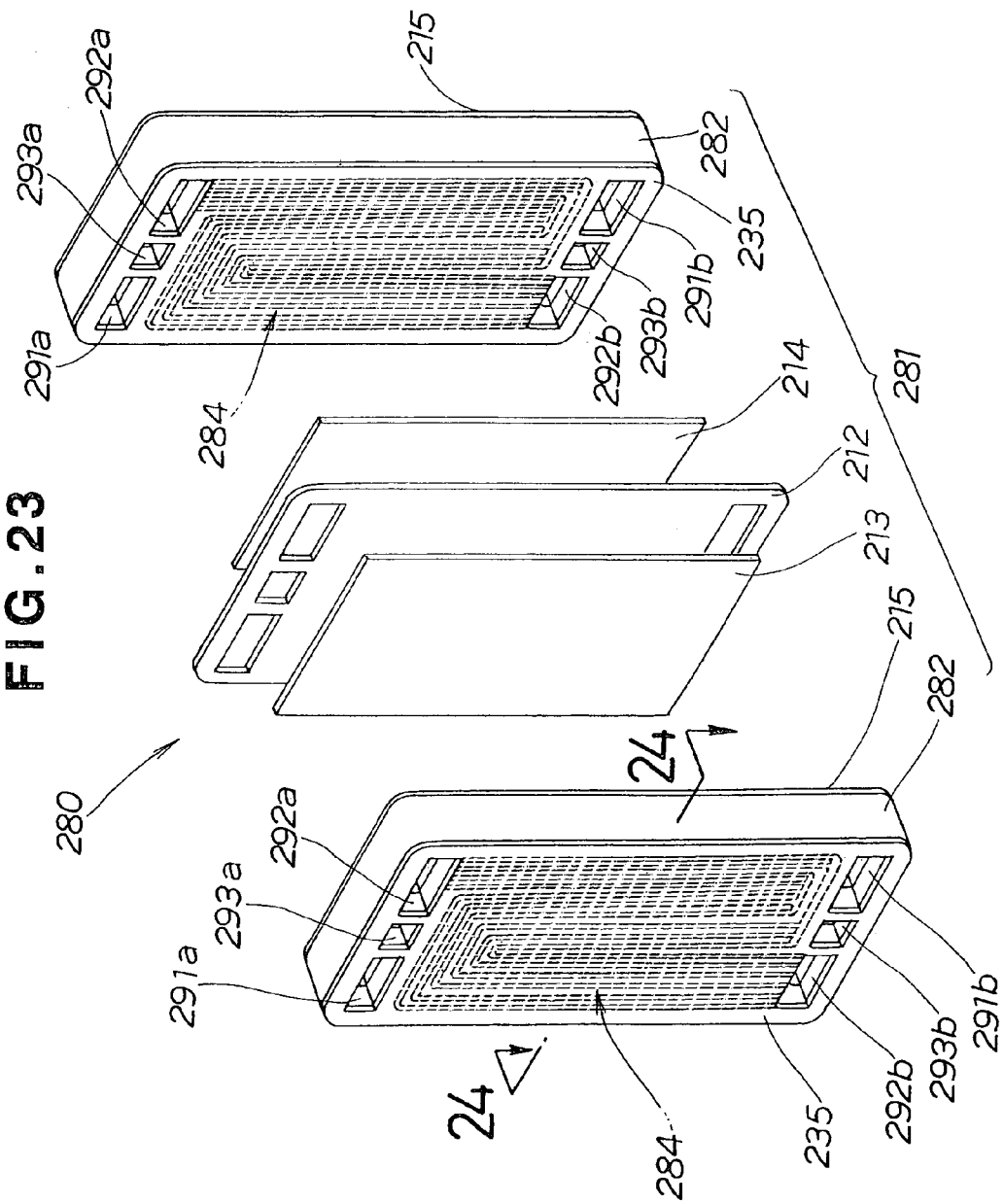
FIG. 23 is an exploded perspective view of a fuel cell manufactured by a fuel cell separator manufacturing method according to an eighth embodiment of the invention.

FIG. 23 shows a fuel cell having a fuel cell separator according to the eighth embodiment.

A fuel cell 280 of the eighth embodiment has a cell module 281 made by appending an anode electrode 213 and a cathode electrode 214 to an electrolyte film 212; bringing a fuel cell separator (separator) 282 face-to-face with the anode electrode 213 side with an anode electrode diffusion layer 215 therebetween; and bringing a separator 282 face-to-face with the cathode electrode 214 side with a cathode electrode diffusion layer 235 therebetween.

Figure 24:
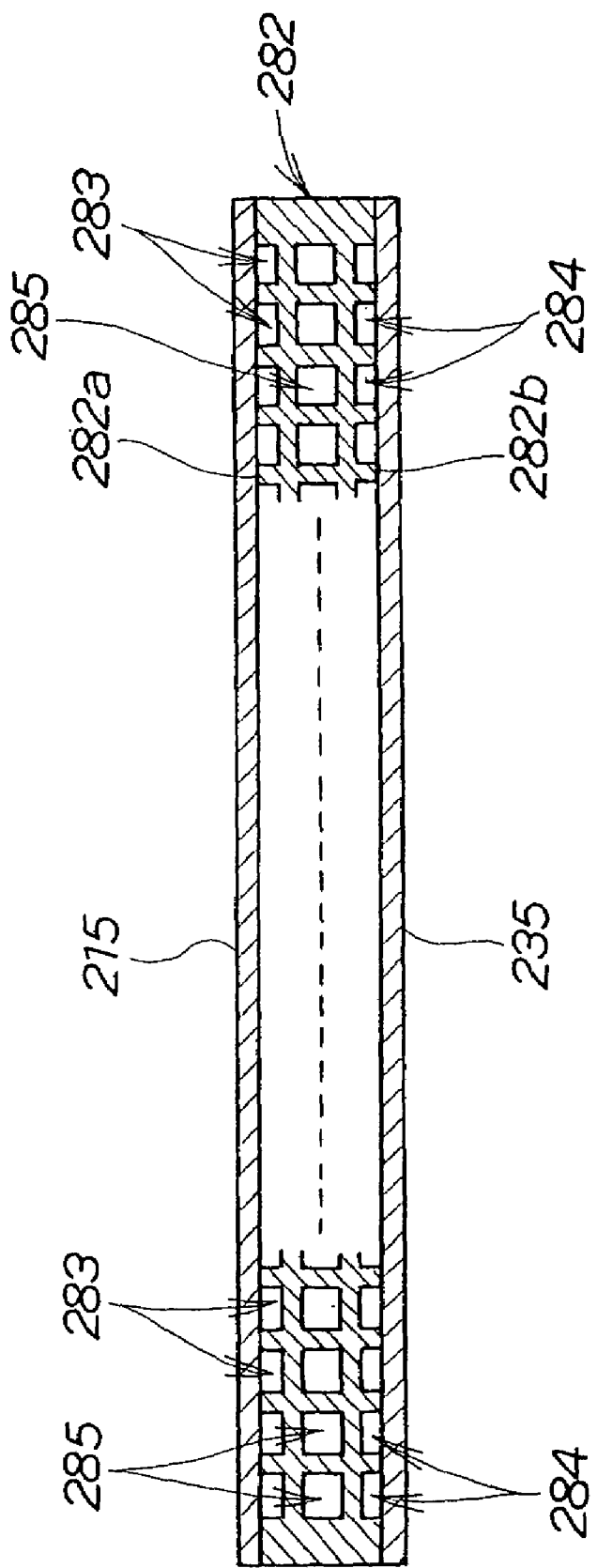
FIG. 24 is a sectional view of a separator taken along line 24—24 in FIG. 23.

The separator 282, as shown in FIG. 24, has numerous fuel gas passages (gas passages) 283 formed in a fuel gas passage formation face 282*a*, by the anode electrode diffusion layer 215 being molded integrally with the fuel gas passage formation face (one of the two faces of the separator) 282*a*.

Also the separator 282 has numerous oxidant gas passages (gas passages) 284 formed in an oxidant gas passage formation face 282*b*, by the cathode electrode diffusion layer 235 being molded integrally with the oxidant gas passage formation face (one other of the two faces of the separator) 282*b*.

And also, the separator 282 has numerous cooling water passages 285, formed between the fuel gas passages 283 and the oxidant gas passages 284.

As the resin constituting the separators 282, as in the sixth embodiment, a resin composition including 60 to 90 wt % carbon material made by blending natural graphite, artificial graphite, ketjen black, acetylene black or the like singly or mixedly with a thermoplastic resin having resistance to acid can be given as an example.

As the thermoplastic resin having acid resistance, for example ethylene vinyl acetate copolymer, ethylene ethyl acrylate copolymer, straight-chain low-density polyethylene, polyphonylene sulfide, modified polyphenylene oxide and so on can be cited, although the invention is not limited to these.

The fuel gas passages 283 connect with fuel gas supply openings 291*a* in the left sides of top parts of the separators 282 shown in FIG. 23, and connect with fuel gas discharge openings 291*b* in the right sides of bottom parts of the separators 282.

The oxidant gas passages 284 shown in FIG. 24 connect with oxidant gas supply openings 292*a* in the right sides of the top parts of the separators 282 shown in FIG. 23 and connect with oxidant gas discharge openings 292*b* in the left sides of the bottom parts of the separators 282.

Also, the cooling water passages 285 shown in FIG. 24 connect with cooling water supply openings 293*a* in the centers of the top parts of the separators 282 shown in FIG. 23 and connect with cooling water discharge openings 293*b* in the centers of the bottom parts of the separators 282.

That is, the fuel cell separators 282 of the eighth embodiment differ from the sixth embodiment only in the point that by the cooling water passages 285 being formed between the fuel gas passages 283 and the oxidant gas passages 284 the first and second separators 220, 240 of the sixth embodiment are molded integrally, and in the rest of its construction they are the same as the sixth embodiment.

By the first and second separators 220, 240 being formed integrally like this, electrical contact resistance arising between the pair of first and second separators 220, 240 is eliminated and output decrease of the fuel cell is better prevented.

Next, a fuel cell separator manufacturing method according to the eighth embodiment will be described, on the basis of FIG. 25 to FIG. 29.

First, a step for molding a core 300 (see FIG. 27) for forming the fuel gas passages 283, the oxidant gas passages 284 and the cooling water passages 285 (see FIG. 24) with a water-soluble polymer will be described, on the basis of FIG. 25 to FIG. 27. This core 300 is made up of a first gas passage core, a second gas passage core and a cooling water passage core, and manufacturing steps for the first gas passage core, the second gas passage core and the cooling water passage core are described below. The core 300 is molded from a water-soluble polymer as in the sixth embodiment. As the water-soluble polymer, for example polyacrylamide, polyacrylic, polymetacrylic, polyitaconate, polyvinyl alcohol and the like can be given as examples, although the invention is not limited to this. That is, as the water-soluble polymer, any substance which can be used as cores and has water-solubility can be used.

Figure 25:
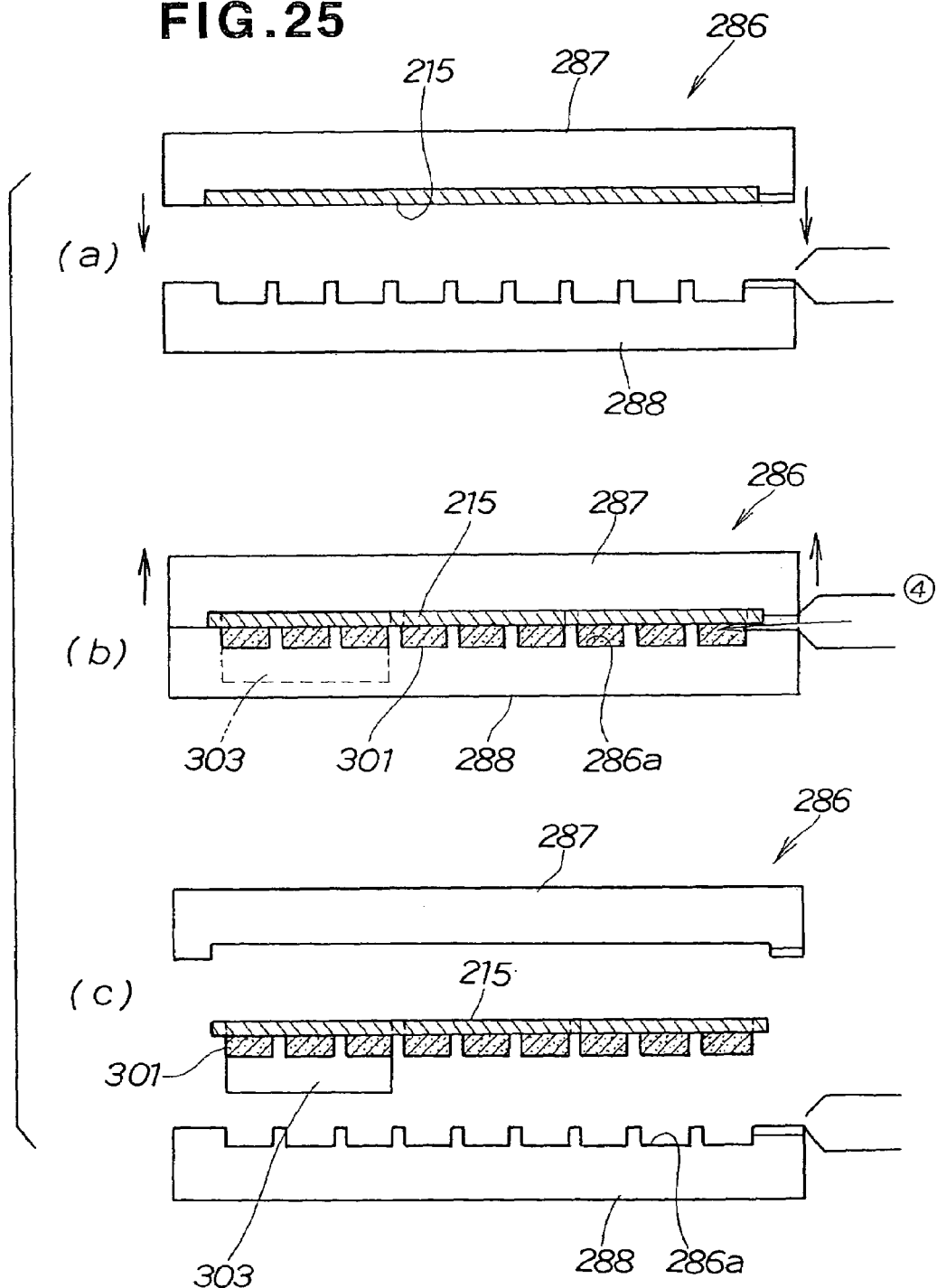
FIG. 25 is a view showing a first step of a fuel cell separator manufacturing method according to the eighth embodiment, and shows a step of molding a first gas passage core.

FIGS. 25(*a*) to (*c*) show a first step of a fuel cell separator manufacturing method according to the eighth embodiment. First, an example of molding the first gas passage core of the fuel gas passages 283 shown in FIG. 24 will be described.

As shown in FIG. 25(*a*), after an anode electrode diffusion layer 215 is set on a movable die 287 of an open core mold 286, the movable die 287 is lowered toward a fixed die 288 as shown by the arrows to close the core mold 286.

In FIG. 25(*b*), the inside of the cavity 286*a* of the core mold 286 is filled with a molten water-soluble polymer as shown by the arrow [4]. After the water-soluble polymer is allowed to solidify and a first gas passage core 301 is bonded to (that is, integrated with) the anode electrode diffusion layer 215, the movable die 287 is raised as shown by the arrows.

As shown in FIG. 25(*c*), the first gas passage core 301 molded integrally with the anode electrode diffusion layer 215 is removed from the cavity 286*a* of the core mold 286 having been opened by the movable die 287 being raised.

By a similar step to the step shown in FIG. 25, a second gas passage core 305 (see FIG. 27) for the oxidant gas passages 284 shown in FIG. 24 can be molded integrally with the cathode electrode diffusion layer 235.

The first gas passage core 301 for the fuel gas passages 283 and the anode electrode diffusion layer 215, and the second gas passage core 305 for the oxidant gas passages 284 and the cathode electrode diffusion layer 235, will be described in detail with reference to FIG. 27.

Figure 26:
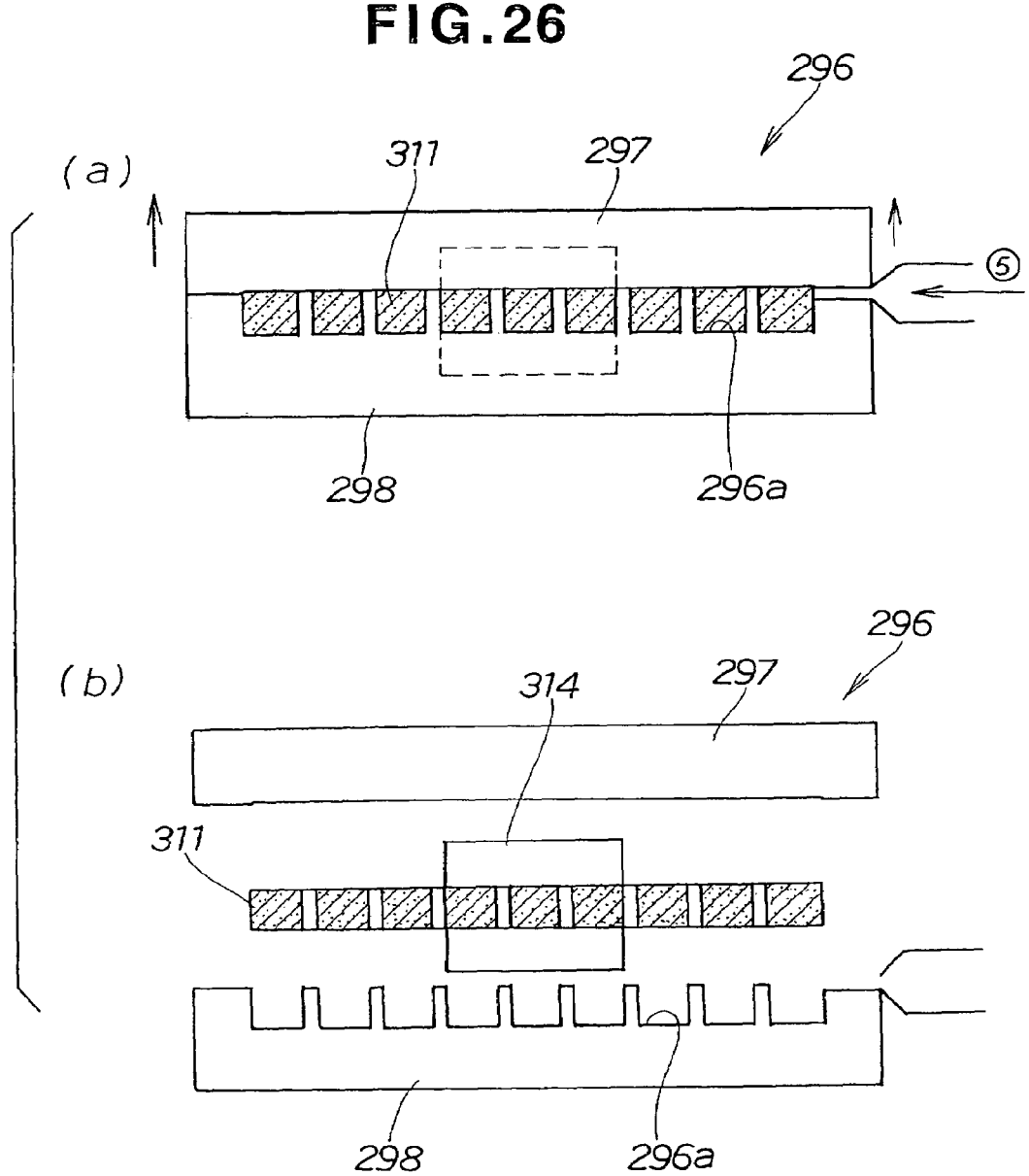
FIG. 26 is a view showing a second step of a fuel cell separator manufacturing method according to the eighth embodiment, and shows a step of molding a cooling water passage core.

FIG. 26(*a*) and (*b*) show a second step of a fuel cell separator manufacturing method according to the eighth embodiment, and a molding example of the cooling water core for the cooling water passages 285 shown in FIG. 24 will be described.

As shown in FIG. 26(*a*), with a core mold 296 locked, the cavity 296*a* of the core mold 296 is filled with a molten water-soluble polymer as shown by the arrow [5]. After the water-soluble polymer is allowed to solidify and form a cooling water passage core 311, the movable die 297 is raised as shown with arrows.

Next, as shown in FIG. 26(*b*), the cooling water passage core 311 is removed from the cavity 296*a* of the core mold 296 having been opened by the raising of the movable die 297.

The molded cooling water passage core 311 for the cooling water passages 285 will be described in detail with reference to FIG. 27.

Figure 27:
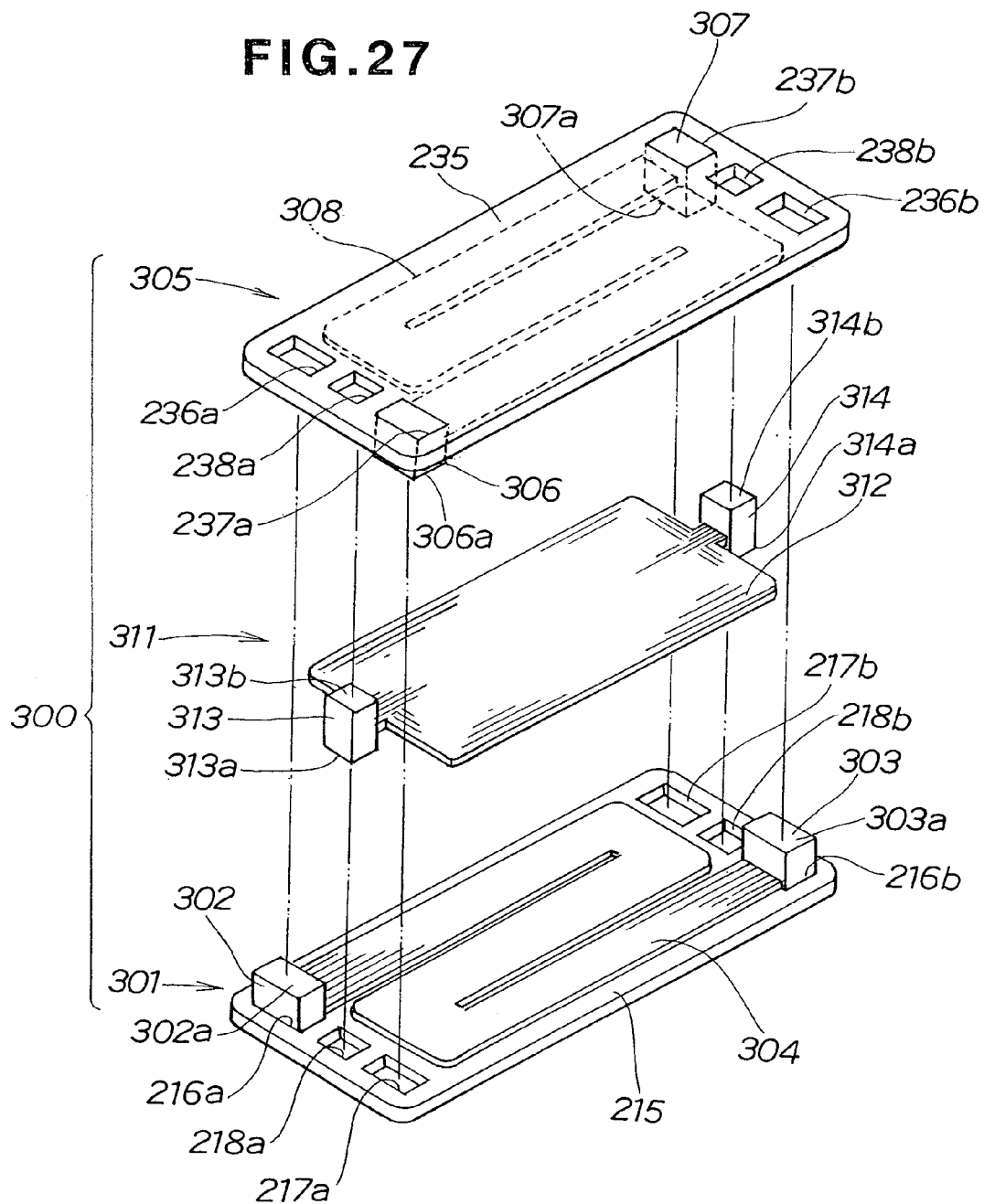
FIG. 27 is a perspective view of a first gas passage core, a second gas passage core and a cooling water passage core used in a fuel cell separator manufacturing method according to the eighth embodiment.

FIG. 27 shows a core (first and second gas passage cores and a cooling water passage core) used in a fuel cell separator manufacturing method according to the eighth embodiment.

The anode electrode diffusion layer 215 has at one end a fuel gas supply opening 216*a*, a cooling water supply opening 218*a* and an oxidant gas supply opening 217*a*, and has at its other end a fuel gas discharge opening 216*b*, a cooling water discharge opening 218*b* and an oxidant gas discharge opening 217*b*. The first gas passage core 301 is molded integrally with the anode electrode diffusion layer 215.

That is, the first gas passage core 301 has a fuel gas supply opening core 302 at the fuel gas supply opening 216*a*, and has a fuel gas discharge opening core 303 at the fuel gas discharge opening 216*b*. By a fuel gas passage core 304 being molded integrally with the fuel gas supply opening core 302 and the fuel gas discharge opening core 303, the first gas passage core 301 is obtained. The fuel gas passage core 304 is molded integrally with the anode electrode diffusion layer 215. By this means, the anode electrode diffusion layer 215 and the first gas passage core 301 can be combined integrally.

The cathode electrode diffusion layer 235 has at one end a fuel gas supply opening 236*a*, a cooling water supply opening 238*a* and an oxidant gas supply opening 237*a*, and has at its other end a fuel gas discharge opening 236*b*, a cooling water discharge opening 238*b* and an oxidant gas discharge opening 237*b*. The second gas passage core 305 is molded integrally with this cathode electrode diffusion layer 235.

That is, the second gas passage core 305 has an oxidant gas supply opening core 306 at the oxidant gas supply opening 237*a*, and has an oxidant gas discharge opening core 307 at the oxidant gas discharge opening 237*b*. By an oxidant gas passage core 308 being molded integrally with the oxidant gas supply opening core 306 and the oxidant gas discharge opening core 307, the second gas passage core 305 is obtained. The oxidant gas passage core 308 is molded integrally with the cathode electrode diffusion layer 235. By this means, it is possible to combine the cathode electrode diffusion layer 235 and the second gas passage core 305 integrally.

The cooling water passage core 311 disposed between the first gas passage core 301 and the second gas passage core 305 is formed integrally with a cooling water supply opening core 313 at one end and formed integrally with a cooling water discharge opening core 314 at its other end. This cooling water supply opening core 313 fits in the respective cooling water supply openings 218*a*, 238*a* of the anode electrode diffusion layer 215 and the cathode electrode diffusion layer 235 and fits in the respective cooling water supply openings 218*b*, 238*b* of the anode electrode diffusion layer 215 and the cathode electrode diffusion layer 235.

At the same time, the fuel gas supply opening core 302 and the fuel gas discharge opening core 303 of the anode electrode diffusion layer 215 side fit respectively in the fuel gas supply opening 236*a* and the fuel gas discharge opening 236*b* of the cathode electrode diffusion layer 235.

Also, the oxidant gas supply opening core 306 and the oxidant gas discharge opening core 307 of the cathode electrode diffusion layer 235 side fit respectively in the oxidant gas supply opening 217*a* and the oxidant gas discharge opening 217*b* of the anode electrode diffusion layer 215.

As a result, the respective bottom ends 313*a*, 314*a* of the cooling water supply opening core 313 and the cooling water discharge opening core 314 become flush with the anode electrode diffusion layer 215. Also, the respective top ends 313*b*, 314*b* of the cooling water supply opening core 313 and the cooling water discharge opening core 314 become flush with the cathode electrode diffusion layer 235.

Also, the respective top ends 302*a*, 303*a* of the fuel gas supply opening core 302 and the fuel gas discharge opening core 303 become flush with the cathode electrode diffusion layer 235.

And also, the respective bottom ends 306a, 307a of the oxidant gas supply opening core 306 and the oxidant gas discharge opening core 307 become flush with the anode electrode diffusion layer 215.

Next, a step of molding a separator will be described, on the basis of FIG. 28 and FIG. 29.

FIG. 28(a) and (b) show a third step of a fuel cell separator manufacturing method according to the eighth embodiment of the invention.

As shown in FIG. 28(a), the first gas passage core 301 and the anode electrode diffusion layer 215 are set in the fixed die 321 of a metal mold 320, and the cooling water passage core 311 is placed on the first gas passage core 301 as shown with arrows.

Next, the second gas passage core 305 and the cathode electrode diffusion layer 235 are placed on the cooling water passage core 311 as shown with arrows, and a movable die 322 is lowered to close the metal mold 320.

Here, the second gas passage core 305 and the cathode electrode diffusion layer 235 shown in FIG. 27 are supported on a cavity face 323a by the oxidant gas supply opening core 306 and the oxidant gas discharge opening core 307. The cooling water passage core 311 is supported on the cavity face 323a by the cooling water supply opening core 313 and the cooling water discharge opening core 314.

In this way, the second gas passage core 305 is disposed in the cavity 323 on the oxidant gas supply opening core 306 and the oxidant gas discharge opening core 307, and the cooling water passage core 311 is disposed in the cavity 323 on the cooling water supply opening core 313 and the cooling water discharge opening core 314. Because the second gas passage core 305 and the cooling water passage core 311 are disposed in the cavity 323 by this means, it is possible to dispense with a core-supporting member, which has normally been necessary.

When a core-supporting member is provided, there is a risk that after the inside of the cavity 323 is filled with resin and the separator is molded the core-supporting member part will remain in the separator as a gap. In this case, it is necessary to fill the remaining gap with a sealant such as a silicon agent, but with the eighth embodiment there is no such necessity.

As shown in FIG. 28(b), by the metal mold 320 being closed, the first and second gas passage cores 301, 305 and the cooling water passage core 311 are disposed in the cavity 323 of the metal mold 320. The anode electrode diffusion layer 215 is disposed in a gap between the first gas passage core 301 and the cavity face 323a of the fixed die 321. The cathode electrode diffusion layer 235 is disposed in a gap between the second gas passage core 305 and the cavity face 323b of the movable die 322. In this state, the cavity 323 is filled with molten resin as shown by the arrow [6].

FIGS. 29(a) to (c) show a fourth step of a fuel cell separator manufacturing method according to the eighth embodiment.

As shown in FIG. 29(a), after the separator 282 filled with resin having been allowed to solidify is molded integrally with the core 300 (the first gas passage core 301, the second gas passage core 305 and the cooling water passage core 311), the anode electrode diffusion layer 215 and the cathode electrode diffusion layer 235, the movable die 322 is raised to open the metal mold 320. After the mold is opened the separator 282, the core 300, the anode electrode diffusion layer 215 and the cathode electrode diffusion layer 235 are taken out from inside the cavity 323 of the metal mold 320.

As shown in FIG. 29(b), the integrated separator 282, core 300, anode electrode diffusion layer 215 and cathode electrode diffusion layer 235 are immersed in water 326 in a water tank 325. By the core 300 being dissolved by the water 326 by this means, it is dissolved out from inside the separator 282.

Because as a result of the core 300 being molded with a water-soluble polymer it can be dissolved out with water 326, the equipment for dissolving the core 300 can be made simple, and it is possible to suppress equipment expenditure and achieve cost reductions.

In FIG. 29(c), by dissolving out the first and second gas passage cores 301, 305 and the cooling water passage core 311 from inside the separators 282, numerous fuel gas passages 283, numerous cooling water passages 285 and numerous oxidant gas passages 284 can be formed in the separator 282.

In this state, by taking the separator 282, the anode electrode diffusion layer 215 and the cathode electrode diffusion layer 235 out from inside the water tank 325, a separator 282 formed integrally with and between the anode electrode diffusion layer 215 and the cathode electrode diffusion layer 235 is obtained. This separator 282 is inverted with respect to the separator 282 shown in FIG. 24.

With the eighth embodiment described above, the same effects as those of the sixth embodiment can be obtained. That is, with the eighth embodiment, by forming the core 300 from a water-soluble polymer and dissolving the core 300 out with water 326 after the molding of the separator 282, numerous fuel gas passages 283 and oxidant gas passages 284 can be formed simply.

Also, as a result of the separator 282 being formed integrally with the anode electrode diffusion layer 215 and the cathode electrode diffusion layer 235, electrical contact resistance between the separator 282 and the anode electrode diffusion layer 215 can be suppressed, electrical contact resistance between the separator 282 and the cathode electrode diffusion layer 235 can be suppressed, and output decrease of the fuel cell can be prevented.

Additionally, with the eighth embodiment, as a result of the water-soluble polymer core 300 being utilized to form the numerous cooling water passages 285 inside the separator 282, it is unnecessary for a pair of separators to be brought together to form the cooling water passages, as in related art. Consequently, there ceases to be the electrical contact resistance that arises between the pair of separators in related art. And by suppressing contact resistance like this, it is possible to reduce resistance over-voltage and prevent output decrease of the fuel cell.

Next, the resistance over-voltage of the eighth embodiment will be explained on the basis of Table 2 below.

TABLE 2

| | | Second Comparison Example | Eighth Embodiment |
|---|---|---|---|
| Cell Module Temp. | | 80° C. | 80° C. |
| Anode Gas | | fuel gas (pure $H_2$) | fuel gas (pure $H_2$) |
| Cathode Gas | | oxidant gas (air) | oxidant gas (air) |
| Gas Temp. | anode | 80° C. | 80° C. |
| | cathode | 80° C. | 80° C. |
| Gas Pressure | anode | 50 kPa | 50 kPa |
| | cathode | 100 kPa | 100 kPa |
| Current Density | | 0.883 A/cm$^2$ | 0.883 A/cm$^2$ |
| Result | | resistance over-voltage of eighth embodiment decreased by 0.027 V per cell module compared to second comparison example | |

The second comparison example is one made by bringing a second separator together with a first separator, without integrating the first separator and the second separator.

The eighth embodiment is the eighth embodiment wherein the separator is integrated.

The resistance over-voltages of the second comparison example and the eighth embodiment were measured under the following conditions.

That is, the cell module temperature was set to 80° C. and pure $H_2$ was supplied as the anode gas (the fuel gas), and air was supplied as the cathode gas (the oxidant gas).

The anode side fuel gas temperature was made 80° C. and the cathode side oxidant gas temperature was made 80° C., and the anode side fuel gas pressure was made 50 kPa and the cathode side oxidant gas pressure was made 100 kPa. Under these conditions, a current of current density 0.883 $A/cm^2$ was passed.

The result of this was that the resistance over-voltage of the eighth embodiment was reduced by 0.027 V per cell module compared to the resistance over-voltage of the second comparison example. Accordingly, it can be seen that, by integrating the separator as in the eighth embodiment, it is possible to reduce resistance over-voltage and prevent output decrease of the fuel cell.

Next, a ninth embodiment will be described.

In the eighth embodiment, as shown in FIG. 27, an example wherein a first gas passage core 301 was molded integrally with the anode electrode diffusion layer 215 and a second gas passage core 305 was molded integrally with the cathode electrode diffusion layer 235 was described; however, the invention is not limited to this, and it is also possible to mold the first gas passage core 301 apart from the anode electrode diffusion layer 215 and to mold the second gas passage core 305 apart from the cathode electrode diffusion layer 235.

Figure 28:
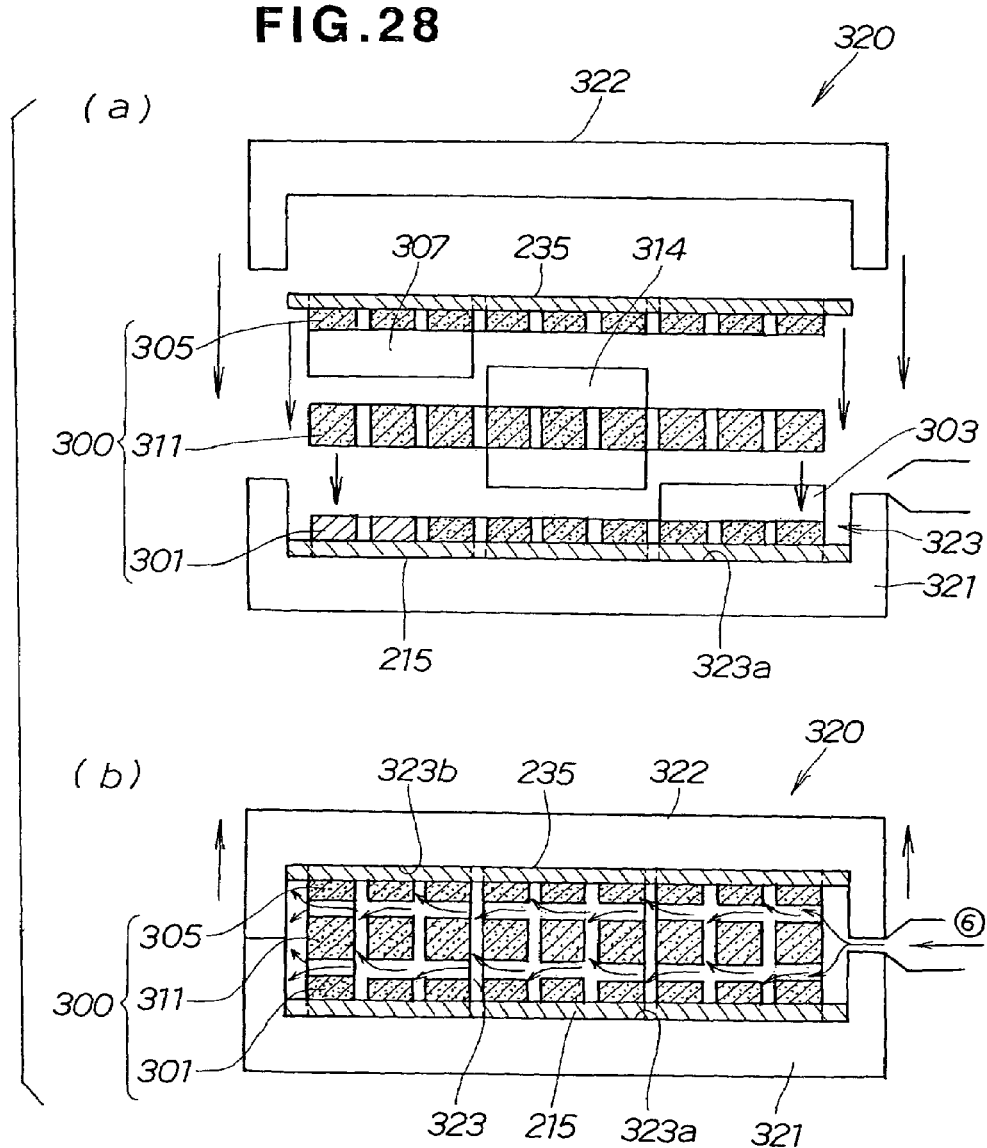
FIG. 28 and FIG. 29 are views showing a third step and a fourth step of a fuel cell separator manufacturing method according to the eighth embodiment, and show steps for molding a separator.
Figure 29:
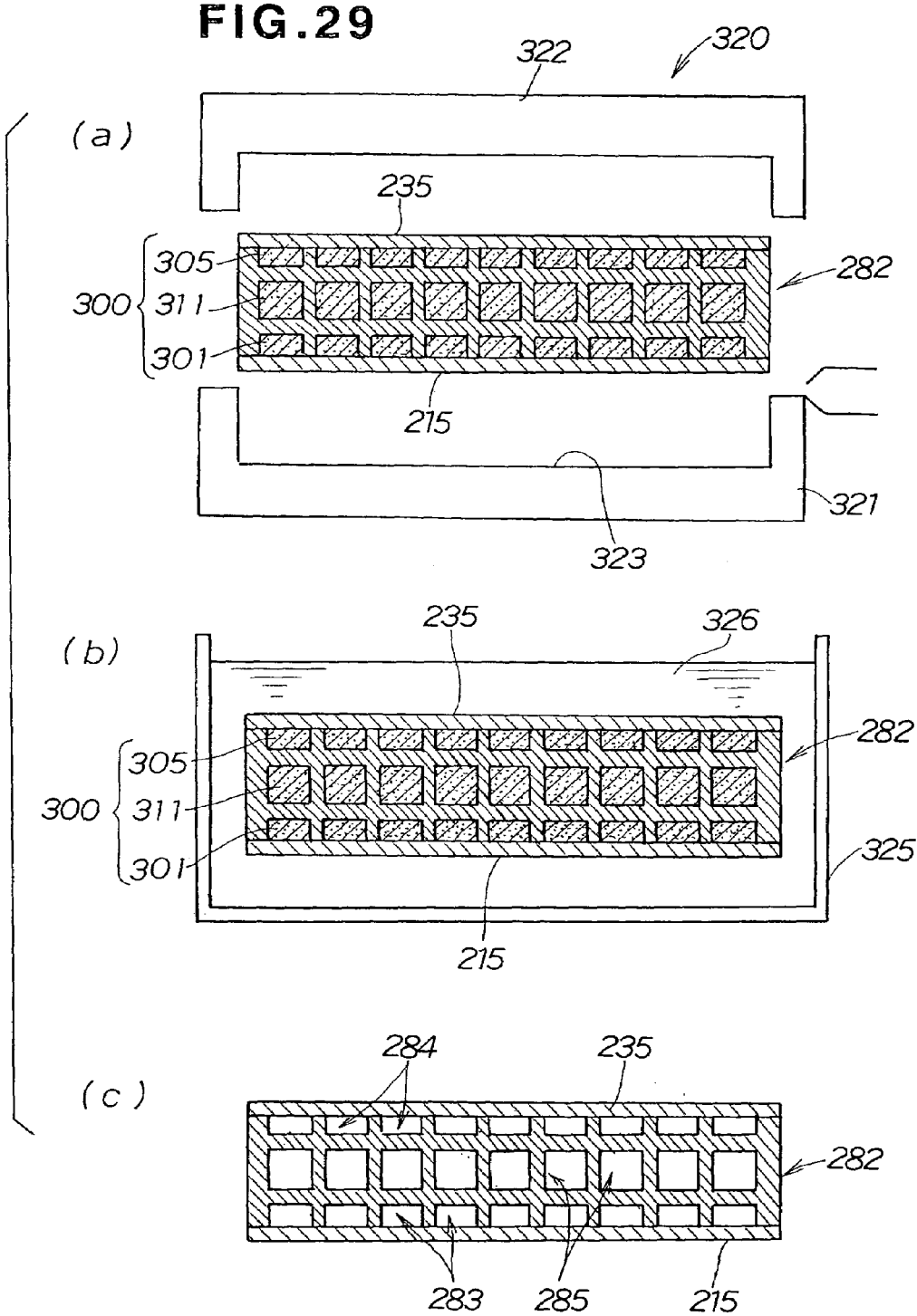

In this case, first, the anode electrode diffusion layer 215 is disposed inside the cavity 323 of the metal mold 320 shown in FIG. 28, and the first gas passage core 301 is placed on this anode electrode diffusion layer 215. The cooling water passage core 311 is placed on this first gas passage core 301; the second gas passage core 305 is placed on the cooling water passage core 311; and then the cathode electrode diffusion layer 235 is placed on the second gas passage core 305.

By closing the metal mold 320 in this state, in the same way as in FIG. 28 (b) of the eighth embodiment, the first gas passage core 301, the second gas passage core 305, the cooling water passage core 311, the anode electrode diffusion layer 215 and the cathode electrode diffusion layer 235 can be set inside the cavity 323. Accordingly, in this ninth embodiment also, the same effects as those of the eighth embodiment can be obtained.

With the fuel cell separator manufacturing method of the ninth embodiment, the first gas passage core 301 can be formed separately from the anode electrode diffusion layer 215, and the second gas passage core 305 can be formed separately from the cathode electrode diffusion layer 235. Consequently, because the molding method of the first and second passage cores 301, 305 can be suitably selected from either of the eighth embodiment and the ninth embodiment, the freedom of design can be increased.

In the sixth to eighth embodiments, solid polymer fuel cells 200, 280 using a solid polymer material as the electrolyte film 212 were described; however, the invention is not limited to this, and can also be applied to other fuel cells.

Although in the sixth and seventh embodiments examples wherein the first and second separators 220, 240 were molded by the injection molding method were described, the invention is not limited to this, and for example it is also possible to mold them by the thermal press-molding method or the transfer molding method. The transfer molding apparatus is a method wherein one shot of the molding material is put in a pot separate from the cavity, and the material in a molten state is transferred to the cavity for molding by a plunger.

For molding the first and second separators 220, 240 by the thermal press-molding method, as the resin constituting the first and second separators 220, 240, a resin composition including 60 to 90 wt % carbon material made by blending natural graphite, artificial graphite, ketjen black, acetylene black or the like singly or mixedly with a thermoplastic resin having resistance to acid can be given as an example. As the thermosetting resin having acid resistance, for example phenol, vinyl esters can be cited, but the invention is not limited to these.

INDUSTRIAL APPLICABILITY

In the manufacture of a separator of a fuel cell, in using a core to form passages for fuel gas or passages for cooling water, because a low-melting-point metal or a water-soluble polymer is used, and the core is removed by heating or by dissolving with water, the passages can be formed easily, and, compared to related art wherein the passages have been formed by bringing separators together, the electrical contact resistance is low and sealing improves. Consequently, the invention is useful in various industries manufacturing fuel cells.

The invention claimed is:

1. A fuel cell separator manufacturing method wherein a preform is molded from a knead of carbon and a thermosetting resin and said preform is used to form cooling water passages between adjacent separators, comprising the steps of:
   providing a core, said core being made of a low-melting-point metal;
   providing a holding member, said holding member being made of a light metal with a high thermal conductivity;
   interposing the core and the holding member between two of said preforms, said core forming the cooling water passages and said holding member holding said core;
   molding a separator by compressing and heating the preforms, the core, and the holding member en bloc; and
   forming the cooling water passages by melting and discharging the core in a subsequent annealing step.

2. A fuel cell separator manufacturing method, comprising the steps of:
   making with a water-soluble polymer a core for forming gas passages;
   disposing the core in a cavity of a metal mold and disposing an electrode diffusion layer in a gap between the core and a face of the mold defining the cavity;
   filling the cavity with molten resin;
   removing a separator with the molten resin solidified from inside the cavity after forming the core and the electrode diffusion layer integrally; and
   forming gas passages in the surface of the separator with the separator and the electrode diffusion layer by dissolving the core out of the separator with water.

3. A fuel cell separator manufacturing method, comprising the steps of:
    making with a water-soluble polymer a gas passage core and a cooling water passage core for forming gas passages and cooling water passages;
    disposing the gas passage core so as to face a face of a metal mold that defines a cavity of the metal mold;
    disposing an electrode diffusion layer in a gap between the gas passage core and the cavity face;
    disposing the cooling water passage core a predetermined spacing from the gas passage core;
    filling the cavity with molten resin;
    removing a separator with the molten resin solidified from inside the cavity after forming the gas passage core, the cooling water passage core, and the electrode diffusion layer integrally; and
    forming gas passages in the surface of the separator with the separator and the electrode diffusion layer and forming cooling water passages inside the separator by dissolving out the gas passage core and the cooling water passage core from the separator with water.

* * * * *